(12) United States Patent
Wang et al.

(10) Patent No.: US 9,476,464 B2
(45) Date of Patent: Oct. 25, 2016

(54) ELECTROMAGNETIC DRIVING DEVICE AND METHODS FOR MANUFACTURING AND CONTROLLING SAME

(75) Inventors: Zhaoyu Wang, Longkou (CN); Ziyi Xing, Longkou (CN); Dianyun Li, Longkou (CN)

(73) Assignee: LONGKOU ZHONGYU MACHINERY CO., LTD, Longkou, Shandong (CN)

( * ) Notice: Subject to any disclaimer, the term of this patent is extended or adjusted under 35 U.S.C. 154(b) by 0 days.

(21) Appl. No.: 14/371,523

(22) PCT Filed: Jan. 11, 2012

(86) PCT No.: PCT/CN2012/070226
§ 371 (c)(1),
(2), (4) Date: Sep. 15, 2014

(87) PCT Pub. No.: WO2013/104117
PCT Pub. Date: Jul. 18, 2013

(65) Prior Publication Data
US 2015/0034447 A1    Feb. 5, 2015

(51) Int. Cl.
F16D 27/14 (2006.01)
F16D 43/18 (2006.01)
F16D 13/10 (2006.01)
F16D 27/102 (2006.01)
F16D 11/16 (2006.01)
F16D 27/01 (2006.01)

(52) U.S. Cl.
CPC ............... *F16D 27/14* (2013.01); *F16D 11/16* (2013.01); *F16D 13/10* (2013.01); *F16D 27/102* (2013.01); *F16D 43/18* (2013.01); *F16D 27/01* (2013.01); *F16D 2250/0084* (2013.01); *Y10T 29/4902* (2015.01)

(58) Field of Classification Search
CPC ...... F16D 27/004; F16D 27/01; F16D 27/10; F16D 27/102; F16D 27/12; F16D 27/14; F16D 2027/005; F16D 43/18; F16D 2043/145; F16D 13/10; F16D 13/14; F16D 13/16; F16D 13/18; F16D 11/16; F16D 48/064; F16D 2250/0084
See application file for complete search history.

(56) References Cited

U.S. PATENT DOCUMENTS 4,206,837 A  6/1980 Brown et al.
4,589,536 A  5/1986 Strikis et al.
(Continued)

FOREIGN PATENT DOCUMENTS

CN   2668923   1/2005
CN   2809324   8/2006
(Continued)

*Primary Examiner* — Jacob S Scott

(57) ABSTRACT

An electromagnetic driving device includes a driving disc, and also a first driving device, a second driving device and a first electrical control device. When the first electrical control device is energized, the first electrical control device drives the first driving device such that the second driving device is disengaged from the driving disc. When the first electrical control device is de-energized, the first electrical control device drives the first driving device such that the second driving device is engaged with the driving disc. The device aims to provide an electromagnetic driving device able to operate and serve the function of driving even if a power supply system of an electromagnetic clutch malfunctions or a sudden power cut occurs, avoiding the series of adverse effects caused by the failure of the electromagnetic clutch.

7 Claims, 18 Drawing Sheets

(56) References Cited

U.S. PATENT DOCUMENTS

| | | | | |
|---|---|---|---|---|
| 6,343,680 B1* | 2/2002 | Hakamada | ............ | F16D 48/064 192/35 |
| 8,267,237 B2* | 9/2012 | Winkler | ................ | F16D 27/112 192/200 |
| 2011/0236231 A1* | 9/2011 | Ikegawa | ................ | F16D 13/04 417/316 |
| 2012/0111688 A1* | 5/2012 | Komai | .................. | F16D 27/102 192/74 |
| 2013/0112523 A1* | 5/2013 | Ikegawa | ............... | F16D 27/105 192/74 |
| 2013/0334000 A1* | 12/2013 | Gerauer | .................. | F16D 11/14 192/69.7 |

FOREIGN PATENT DOCUMENTS

| | | |
|---|---|---|
| CN | 201009726 | 1/2008 |
| JP | 1988-76924 | 4/1988 |

\* cited by examiner

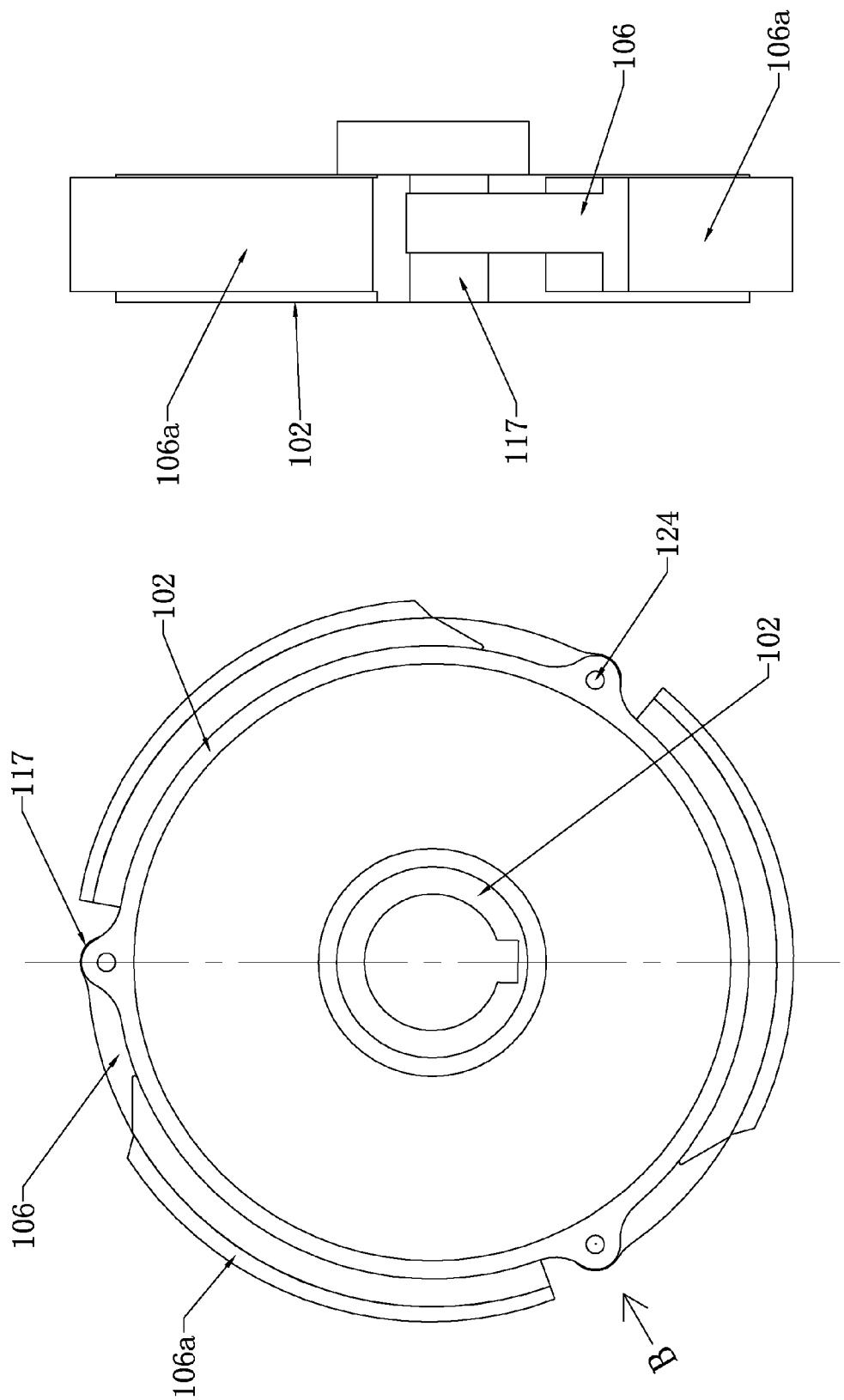

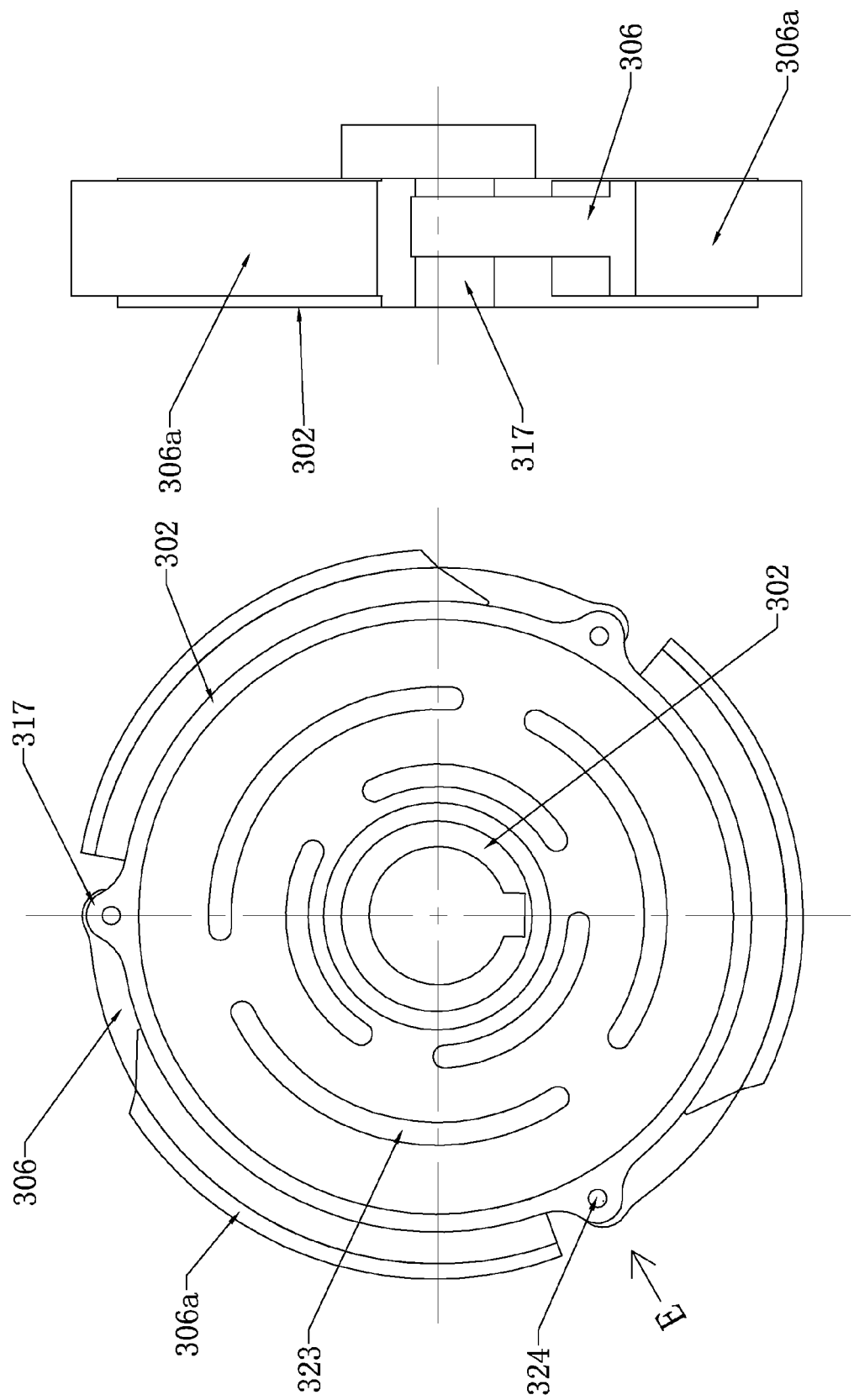

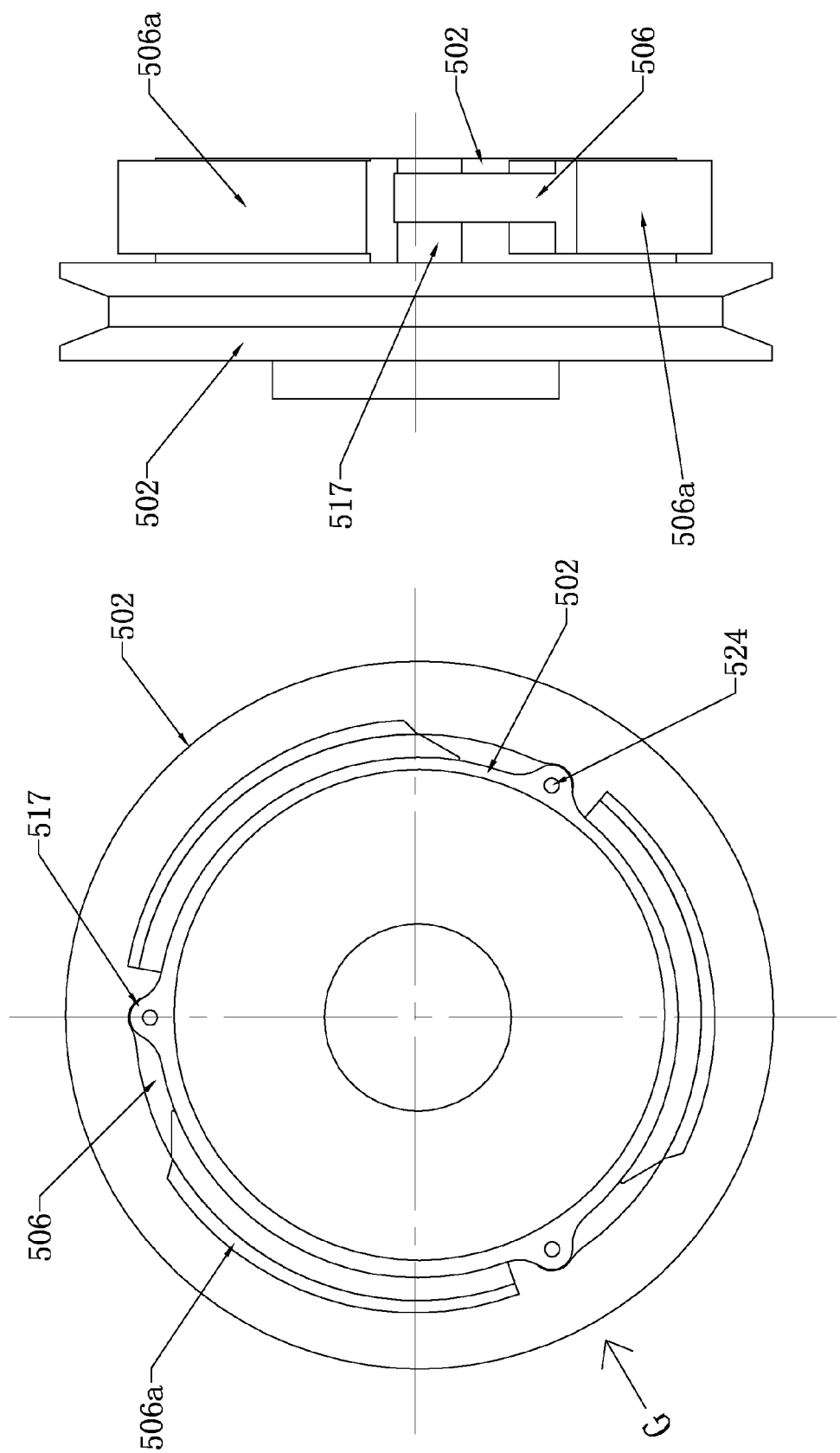

ELECTROMAGNETIC DRIVING DEVICE AND METHODS FOR MANUFACTURING AND CONTROLLING SAME

CROSS REFERENCE OF RELATED APPLICATION

This is a U.S. National Stage under 35 U.S.C 371 of the International Application PCT/CN2012/070226, filed Jan. 11, 2012.

BACKGROUND OF THE PRESENT INVENTION

1. Field of Invention

The present invention mainly relates to electromagnetic driving devices used on vehicles, and particularly to an electromagnetic fan clutch and an air pump device, and methods for manufacturing and controlling the same.

2. Description of Related Arts

At present, an electromagnetic fan clutch used on an automobile controls the rotation speed of a fan according to the change of water temperature of an engine, so that the engine of the automobile is remained in the optimal state during the operation process. Specifically, by controlling the energization or de-energization of a coil on an electromagnetic iron core, a suction disc on a magnet fixing disc or a fan fixing disc is controlled to be engaged with or disengaged from a driving disc, thereby controlling the rotation speed of a fan on the fan fixing disc, so as to achieve the effect of cooling the engine by the fan at a proper rotation speed.

As shown in FIG. 1, an existing electromagnetic fan clutch (taking a three-speed electromagnetic fan clutch as an example) comprises a main shaft 1', a driving disc 2', an electromagnetic iron core 3', an outer coil 4a', an inner coil 4b', a fan fixing disc 9', a magnet fixing disc 10', a small spring sheet 12', a small suction disc 13', a large spring sheet 34', a large suction disc 35' and a safety plate 36', wherein the driving disc 2' made of magnetic conductive material is fixedly mounted on the main shaft 1' via a half round key 19'. Several sets of magnetic insulation grooves 23' are provided on a side of the driving disc 2'. The electromagnetic iron core 3' is provided inside an inner cavity of the driving disc 2'. The electromagnetic iron core 3' is mounted on the main shaft 1' via a bearing 5', and provided therein with inner and outer coil inlay slots, respectively. The directions of magnetic conductive opening of the inner and outer coil inlay slots are both the same as the axial direction of the main shaft 1' and directed to the side of the driving disc 2'. The inner and outer coil inlay slots are provided with an inner coil 4b' and an outer coil 4a' in a flat winding manner, respectively. The fan fixing disc 9' and the magnet fixing disc 10' are mounted on the main shaft 1' via bearings 8' and 11', respectively, wherein several fixing holes for inlaying soft magnets 15' are uniformly distributed on an end face of the magnet fixing disc 10' in the fan fixing disc 9' along the circumference. Permanent magnets 14' are sucked on the soft magnets 15'. Soft magnets 16' are inlaid on an end face of the fan fixing disc 9' corresponding to the permanent magnets 14'. The small suction disc 13' is supported and connected to an annular end face of the magnet fixing disc 10' opposite to the inner coil 4b' via the small spring sheet 12'. The large suction disc 35' is supported and connected to an annular end face of the fan fixing disc 9' opposite to the outer coil 4a' via the large spring sheet 34'. Both the small suction disc 13' and the large suction disc 35' are close to the side of the driving disc 2', and have a space with the corresponding end face of the driving disc 2'. The safety plate 36' is fixedly connected to the end face outside the circumference of the fan fixing disc 9', and provided thereon with a locking hole. A mating hole is provided at a position outside the circumference of the driving disc 2' corresponding to the locking hole.

The specific working process of the three-speed electromagnetic fan clutch is as follows: when the temperature of an engine does not reach a low temperature set value (for example, 82° C.) of the three-speed electromagnetic fan clutch, both the inner and outer coils 4b' and 4a' in the electromagnetic iron core 3' are not energized, and the driving disc 2' will neither suck the small suction disc 13' on the magnet fixing disc 10' nor suck the large suction disc 35' on the fan fixing disc 9'. The fan fixing disc 9' slides and rotates freely via the bearing 8', and the magnet fixing disc 10' slides and rotates freely via the bearing 11'. When the temperature of the engine reaches the low temperature set value (82° C.) and is less than a high temperature set value (for example, 88° C.), the inner coil 4b' is energized, and as the magnetic effect of the electromagnetic iron core 3' allows the driving disc 2' to suck the small suction disc 13', the small suction disc 13' and the driving disc 2' rotate synchronously. The small suction disc 13' drives the magnet fixing disc 10' to rotate at a full speed via the small spring sheet 12'. The soft magnets 16' inlaid in the fan fixing disc 9' perform relative rotation in a magnet field formed by the permanent magnets 14' and the soft magnets 15' in the magnet fixing disc 10' so as to cut magnetic lines of force and generate eddy current by themselves. The eddy current generates a new magnetic field, so that the flexible connection and middle-speed rotation of the fan fixing disc 9' and the magnet fixing disc 10' are realized under the action of the magnetic field, and the effects of primary heat dissipation and cooling are achieved. When the temperature of the engine rises to the high temperature set value (88° C.), the outer coil 4b' is energized to generate suction force, so as to suck the large suction disc 35' onto the driving disc 2'. The large suction disc 35' and the driving disc 2' rotate synchronously, and the large suction disc 35' drives the fan fixing disc 9' to rotate at a full speed via the large spring sheet 34', thereby achieving the forceful cooling effect.

However, during the running process of a vehicle, if a power supply system of the electromagnetic fan clutch suddenly malfunctions or is suddenly de-energized, the inner and outer coils 4b' and 4a' fail to work, the rotation speed of the fan blade on the fan fixing disc 9' cannot be controlled to cool the engine by controlling the energization and de-energization of the inner and outer coils 4b' and 4a'. Certainly, the original design structure of the electromagnetic fan clutch is usually provided with a safety plate 36' fitted with an emergency locking bolt carried on the vehicle, and a corresponding locking hole and mating hole. Thus, the driver may park as soon as possible after the power supply system of the electromagnetic fan clutch malfunctions, and then insert the emergency locking bolt into the locking hole on the safety plate 36' and the mating hole on the driving disc 2', so that the fan fixing disc 9' and the driving disc 2' synchronously rotate and the fan rotates at a full speed to cool the engine. If the driver knows that the power supply system malfunctions during driving the vehicle, the driver may park and then fix the fan fixing disc 9' and the driving disc 2' by using the emergency locking bolt, so that the fan rotates at a full speed for cooling. However, it often cannot be assured that the driver can know the malfunction condition at the first time, so the driver cannot park timely to use the emergency locking bolt, and it is relatively troublesome to park to mount the emergency locking bolt. Even if the driver can know the malfunction of the power supply system at the first time, the actual running road condition of the vehicle is complicated and varied. Therefore, in certain particular running environments, the driver cannot park or cannot immediately park to employ bolt locking measures, so that it is possible to cause high-temperature damage and even scrapping of the engine, and even traffic accidents are caused in serious cases. So, the consequences would be unimaginable. In addition, as shown in FIG. 1, when the water temperature of the engine rises to the high temperature set value (88° C.), in order to meet the requirements that, after the outer coil $4a'$ is energized, the electromagnetic iron core $3'$ can have magnetism large enough to suck the large suction disc $35'$ fixedly connected to the fan fixing disc $9'$ onto the driving disc $2'$ and drive the fan fixing disc $9'$ and the driving disc $2'$ to rotate at the same speed, and the engine is required to provide continuous power to the outer coil $4a'$. Thus, larger electric energy is consumed, the power loss of the engine is increased, the engine originally in a high temperature state is further operated in an overloaded state, and the service life of the engine is reduced.

At present, during the running process of a vehicle, air pump devices for vehicle braking systems control air pumps to work by energizing or de-energizing electromagnetic clutches. When the pressure within an air pump is less than a pressure value (for example, 6-8 kg) required by the operation of a braking system, a power supply system of the electromagnetic clutch energizes, and a component for driving a spindle of the air pump to rotate is connected to a rotating belt wheel (the belt wheel is rotated driven by an engine) through the suction force of an electromagnetic iron core, so that the spindle of the air pump and the belt wheel rotate synchronously, thereby achieving the purpose of making the air pump in a working state. When the pressure within the air pump reaches or exceeds the pressure value (for example, 6-8 kg) required by the operation of the braking system, the power supply system of the electromagnetic clutch is de-energized, the spindle of the air pump is disengaged from the belt wheel, and the air pump stops working. However, if the power supply system of the electromagnetic clutch malfunctions, a sudden power cut occurs or the electromagnetic clutch has other failures during the running process of the vehicle, the electromagnetic clutch cannot control the air pump to work in this case, so that the function of the air pump is influenced, the braking system cannot work normally, then it is possible to further result in a series of serious consequences, and a safety guarantee cannot be provided for the driver. Certainly, safety structures for preventing an air pump control system from failure is also mounted on a part of existing vehicles, but it is required to stop the vehicle in the use of these safety structures, and the failure resistant structures are started manually, so there are certain limitations.

SUMMARY OF THE PRESENT INVENTION

To solve the above technical problems, the present invention provides an electromagnetic driving device that is resistant to failure, highly practicable, safe and reliable. The object of the present invention is to provide an electromagnetic driving device capable of working and realizing the function of driving even if a power supply system of an electromagnetic clutch malfunctions or a sudden power cut occurs, avoiding a series of adverse effects caused by the failure of the electromagnetic clutch.

Another technical object of the present invention is to provide a method for manufacturing the electromagnetic driving device with a failure resistant safety device.

Another technical object of the present invention is to provide a method for controlling the electromagnetic driving device with the failure resistant safety device.

An electromagnetic driving device according to the present invention comprises a driving disc, and further comprises a first driving device, a second driving device and a first electrical control device; when the first electrical control device is energized, the first electrical control device drives the first driving device such that the second driving device is disengaged from the driving disc; and when the first electrical control device is de-energized, the first electrical control device drives the first driving device such that the second driving device is engaged with the driving disc.

The electromagnetic driving device according to the present invention employs a structure in which the second driving device is disengaged from the driving disc when the first electrical control device is energized and the second driving device is engaged with the driving disc when the first electrical control device is de-energized, the electromagnetic driving device is able to ensure that driving is controlled by controlling the energization or de-energization of the first electrical control device, and further ensure that the driving disc is able to drive the second driving device to work in the case of sudden power cut of the first electrical control device, thus effectively avoiding driving failure in the case of accidental de-energization of the first electrical control device, and ensuring that the driving device is more safe and reliable. Moreover, the design of the present invention is as follows: the driving disc is able to transfer power to the second driving device when the first electrical control device is de-energized, so the effect of driving is achieved without consuming too much electric energy, thereby saving electric energy and prolonging the service life of a power supply system and a power supply circuit.

The electromagnetic driving device according to the present invention further comprises a driven device to which the second driving device is fixedly connected. The driven device is additionally provided and is fixedly connected to the second driving device, so that the electromagnetic driving device of the present invention is able to drive the second driving device via the driving disc and further drive the driven device to enter a working state. The driving device may be applied in different devices according to different driven devices, so the practicability is high.

The electromagnetic driving device according to the present invention further comprises a driving shaft, the driven device is a fan fixing disc, the driving disc is fixedly mounted on the driving shaft, and the fan fixing disc is mounted on the driving shaft via a first bearing. With respect to the above structure, the electromagnetic driving device according to the present invention is applied in a single-speed electromagnetic fan clutch, so that it is further ensured that the driving disc is able to drive the fan fixing disc to rotate at a full speed to cool an engine in the case of a sudden power cut of the first electrical control device while the full-speed rotation or free sliding rotation of the fan fixing disc is controlled by controlling the energization or de-energization of the first electrical control device, the driving failure is effectively avoided in the case of accidental de-energization of the first electrical control device, it is ensured that the driving device is more safe and reliable when applied in a single-speed electromagnetic fan clutch, and a good running state of an automobile is ensured.

The electromagnetic driving device according to the present invention further comprises a driving shaft and a magnet fixing disc, the driven device is a fan fixing disc, the driving disc is fixedly mounted on the driving shaft, the fan fixing disc is mounted on the driving shaft via a first bearing, and the magnet fixing disc is fixedly mounted on the driving shaft and used for driving the fan fixing disc to rotate at a differential rate due to a magnetic effect. With respect to the above structure, the electromagnetic driving device according to the present invention is applied in a two-speed electromagnetic fan clutch, so that the two-speed electromagnetic fan clutch is able to control the fan fixing disc to rotate at different speeds to cool an engine according to different temperatures of the engine, so as to ensure an optimal working state of the engine; moreover, it is ensured that the fan is able to rotate at a full speed to cool the engine when the power supply system de-energizes, thereby avoiding too high temperature because heat of the engine cannot be dissipated timely in the case of a sudden malfunction of the power supply system.

The electromagnetic driving device according to the present invention further comprises a driving shaft, a magnet fixing disc and a second electrical control device, the driven device is a fan fixing disc, the driving disc is fixedly mounted on the driving shaft, the fan fixing disc is mounted on the driving shaft via a first bearing, the magnet fixing disc is fixedly mounted on the driving shaft via a third bearing and used for driving the fan fixing disc to rotate at a differential rate due to the magnetic effect, the driving disc is engaged with the magnet fixing disc when the second electrical control device is energized, and the driving disc is disengaged with the magnet fixing disc when the second electrical control device is de-energized. With respect to the above structure, the electromagnetic driving device according to the present invention is applied in a three-speed electromagnetic fan clutch, so that the three-speed electromagnetic fan clutch is able to control the fan fixing disc to rotate at different speeds to cool an engine according to different temperatures of the engine, so as to ensure an optimal working state of the engine; moreover, it is ensured that the fan is able to rotate at a full speed to cool the engine when the power supply system de-energizes, thereby avoiding too high temperature because heat of the engine cannot be dissipated timely in the case of a sudden malfunction of the power supply system.

In the electromagnetic driving device according to the present invention, the driven device is an air pump spindle, and the driving disc is mounted on the air pump spindle via a bearing. With respect to the structure, the electromagnetic driving device according to the present invention is applied in an air pump, so that it is ensured that the driving disc is able to drive the air pump spindle to rotate to provide pressure for a braking system of a vehicle in the case of a sudden power cut of the first electrical control device, thereby avoiding driving failure caused in the case of accidental de-energization of the first electrical control device, ensuring that the air pump enters a working state when the electromagnetic clutch fails, and ensuring that the braking system of the vehicle is still able to work normally in the case of a sudden power cut.

In the electromagnetic driving device according to the present invention, the second driving device comprises a driving cylinder. Driving is performed by the driving cylinder, so that manufacturing is simple, the driving effect is good, and mounting is convenient.

In the electromagnetic driving device according to the present invention, the first driving device comprises at least one driving plate. A driving plate structure is employed between the driving disc and the driving cylinder, so that the driving disc and the driving cylinder are able to control the driving plate by energizing or de-energizing the first electrical control device, thereby achieving a purpose of controlling the driving cylinder to be disengaged from or engaged with power of the driving disc by controlling movement of the driving plate; moreover, the driving plate is used as the first driving device, so manufacturing is simple, the cost is low, and the driving effect is good. At least one driving plate is employed, so that the other driving plates are able to continue to play a role of driving once one of the driving plates fails or has a reduced driving effect when in use, thereby better ensuring the overall driving effect of the driving plate.

In the electromagnetic driving device according to the present invention, structures and position relation of the driving plate of the first driving device, the driving cylinder of the second driving device and the first electrical control device may employ the following three modes:

(1) The driving plate comprises three arc plates, three sets of protrusions are provided outside a circumference of the driving disc, the three driving plates are hinged to the corresponding protrusions of the driving disc via pin shafts; the driving cylinder has an end face opposite to the driving disc outside the circumference of the driving disc, a space is provided between the driving plates and the opposite end face of the driving cylinder; the first electrical control device comprises an electromagnet assembly consisting of an electromagnetic iron core and a coil, and the electromagnet assembly is located in an inner cavity of the end face where the circumference of the driving disc is located. The employed three arc driving plates are hinged outside the circumference of the driving disc via the pin shafts, mounting is simple, the driving effect is good, and manufacturing is convenient. The cylinder is provided at a position having a certain space outside the circumference of the driving disc, so that the driving disc is able to compress the driving cylinder under action of a centrifugal force when the coil is de-energized, the driving effect is good, and the cost is low. Moreover, the driving effect is achieved by the centrifugal force rather than specially supplied power, so energy sources are saved.

(2) The driving cylinder has an end face opposite to the driving disc outside a circumference of the driving disc, the opposite end face of the driving cylinder is provided thereon with three sets of protrusions, the driving plate comprises three arc plates, the three driving plates are hinged to the corresponding protrusions of the driving cylinder via pin shafts; a space is provided between the driving plates and the opposite end face of the driving disc; the first electrical control device comprises a permanent magnet and an electromagnet assembly consisting of an electromagnetic iron core and a coil, the permanent magnet is located in an inner cavity of the driving disc, the electromagnet assembly is located outside the opposite end face of the driving cylinder; and a magnetic attraction force applied by the electromagnetic iron core to the driving plates is larger than that applied by the permanent magnet to the driving plates, when the coil is energized. The permanent magnet and the electromagnet assembly are used as the first electrical control device for controlling the movement of the driving plates, and the driving plates are correspondingly mounted on an inside end face of the driving disc. This is a deformation of the structure in (1). Due to such a structure, it may also be realized that the driving plates of the first driving device and the driving cylinder of the second driving device are able to transfer the power of the driving disc to the driven device when the coil is de-energized actively or accidentally. The permanent magnet in the above structure plays a role of suction by its inherent performance, without consuming the specially provided power, so the power consumption is reduced, and energy sources are saved.

(3) The driving plate comprises three arc plates, three sets of protrusions are provided inside the circumference of the driving disc, and the three driving plates are hinged to the corresponding protrusions of the driving disc via pin shafts; the driving cylinder has an end face opposite to the driving disc inside a circumference of the driving disc, and a space is provided between the driving plate and the opposite end face of the driving cylinder; the first electrical control device comprises a permanent magnet and an electromagnet assembly consisting of an electromagnetic iron core and a coil, the permanent magnet is located in an inner cavity of the driving cylinder, the electromagnet assembly is located outside the circumference of the driving disc; and a magnetic attraction force applied by the electromagnetic iron core to the driving plates is larger than that applied by the permanent magnet to the driving plates, when the coil is energized. This structure is another variation of the structure in (1). The driving plates and the driving cylinder are able to transfer the power of the driving disc to the driven device in the case of de-energizing the coil, and the driving plates are correspondingly mounted inside the circumference of the driving disc, so the cost is low, and the driving effect is good.

In the electromagnetic driving device according to the present invention, at the opposite end face of the driving cylinder, the driving plate is fixedly connected with arc friction plates. By employing the structure that the driving plates are connected with the friction plates, the driving plates have good driving effect and long service life.

According to the present invention, a method for manufacturing an electromagnetic driving device is provided, comprising steps of: (a) forming a driving disc; (b) forming a first driving device; (c) forming a second driving device; (d) forming a first electrical control device; (e) mounting the driving disc, the first driving device, the second driving device and the first electrical control device, such that when the first electrical control device is energized, the first electrical control device drives the first driving device to disengage the second driving device from the driving disc; and when the first electrical control device is de-energized, the first electrical control device drives the first driving device such that the second driving device is engaged with the driving disc.

The manufacturing method may be preferably provided as follows:

(1) The first driving device in step (b) comprises three arc driving plates, three sets of protrusions are provided outside a circumference of the driving disc in step (a), the three driving plates are hinged to the corresponding protrusions of the driving disc; the second driving device in step (c) is a driving cylinder, the driving cylinder has an opposite end face outside the circumference of the driving disc after being mounted, a space is provided between the driving plates and the opposite end face of the driving cylinder; the first electrical control device in step (d) is an electromagnet assembly consisting of an electromagnetic iron core and a coil, and the electromagnet assembly is mounted in an inner cavity where the circumference of the driving disc is located; and, the electromagnetic driving device further comprises a driven device, and the driving cylinder is fixed on the driven device after the driven device is mounted.

(2) The first driving device in step (b) comprises three arc driving plates; the second driving device in step (c) is a driving cylinder, the driving cylinder has an opposite end face outside a circumference of the driving disc in step (a) after being mounted, three sets of protrusions are provided inside the opposite end face of the driving cylinder, the three driving plates are hinged to the corresponding protrusions of the driving cylinder via pin shafts, a space is provided between the driving plates and the end face outside the circumference of the driving disc; the first electrical control device in step (d) is a permanent magnet and an electromagnet assembly consists of an electromagnetic iron core and a coil, the permanent magnet is mounted in an inner cavity of the driving disc, the electromagnet assembly is mounted outside the opposite end face of the driving cylinder; the magnetic attraction force applied by the electromagnetic iron core to the driving plate is larger than that applied by the permanent magnet to the driving plate, when the coil is energized; and the electromagnetic driving device further comprises a driven device, the driven device is a fan fixing disc, and the driving cylinder is fixed on the fan fixing disc after the fan fixing disc is mounted.

By employing the above manufacturing method, the mass of the electromagnetic driving device is reduced as much as possible, the material is saved, the precision of each constituent component is improved, the structure and connection relation of each component are simplified, a good driving effect is ensured, driving is controlled through energization and de-energization, and it is ensured that the driving device is able to perform driving when de-energized.

According to the present invention, a method for controlling an electromagnetic driving device is provided, wherein:

(1) When a first electrical control device comprises an electromagnetic iron core and a coil, and energization and de-energization of the coil are related to a water temperature of an engine, the controlling method comprises steps of:

energizing a first electrical control device when the water temperature of the engine is less than a first set value; and de-energizing the first electrical control device when the water temperature of the engine is equal to or more than the first set value.

(2) When an electromagnetic driving device comprises a first electrical control device and a second electrical control device, and energization and de-energization of the both electrical control devices are related to a water temperature of an engine, the controlling method comprises steps of:

energizing a first electrical control device and de-energizing a second electrical control device when the water temperature of the engine is less than a second set value;

energizing the first electrical control device and energizing the second electrical control device when the water temperature of the engine is equal to or more than the second set value and less than a third set value; and de-energizing the first electrical control device and energizing the second electrical control device when the water temperature of the engine is equal to or more than the third set value.

(3) When a first electrical control device comprises an electromagnetic iron core and a coil, and energization or de-energization of the coil is related to a pressure value of an air pump, the controlling method is as follows:

de-energizing a first electrical control device when the pressure value of the air pump is less than a fourth set value; and energizing the first electrical control device when the pressure value of the air pump is equal to or more than the fourth set value.

By employing the above controlling method, the energization and de-energization of the first electrical control device or the second electrical control device are controlled according to different requirements of different devices, so that the cooling requirement of an engine of an automobile or the working requirement of a braking system are met, and it is ensured that the electromagnetic driving device is able to perform driving when the first electrical control device is de-energized.

Embodiments of the present invention will be further described as below in conjunction with the accompanying drawings.

BRIEF DESCRIPTION OF THE DRAWINGS

FIG. 7 is a right view showing a fit of the driving disc and the driving plate in Embodiment 1;

FIG. 8 is a view of FIG. 7 in a direction B;

FIG. 16 is a right view showing a fit of the driving disc and the driving plate in Embodiment 3;

FIG. 17 is a view of FIG. 16 in a direction E;

FIG. 21 is a right view showing a fit of the driving disc and the driving plate in Embodiment 5;

FIG. 22 is a view of FIG. 21 in a direction G;

DETAILED DESCRIPTION OF THE PREFERRED EMBODIMENT

Detail description is made below by taking the situation of applying an electromagnetic driving device provided according to the present invention in an electromagnetic fan clutch and an air pump for automobiles as an example in conjunction with the accompanying drawings, and methods for manufacturing and controlling the device in each embodiment are also described, wherein Embodiments 1 to 3 are implementation ways in which the electromagnetic driving device according to the present invention is applied in single-speed, two-speed and three-speed electromagnetic fan clutches, respectively, wherein both a first electrical control device and a second electrical control device only comprise an electromagnetic iron core and a coil; Embodiment 4 describes an implementation way in which the first electrical control device comprises an electromagnetic iron core, a coil and a permanent magnet, by taking a single-speed electromagnetic fan clutch as an example; and Embodiments 5 and 6 are implementation ways in which the electromagnetic driving device according to the present invention is applied in an air pump, wherein the first electrical control device in Embodiment 5 only comprises an electromagnetic iron core and a coil, while the first electrical control device in Embodiment 6 comprises an electromagnetic iron core, a coil and a permanent magnet.

Embodiment 1

Figure 2:
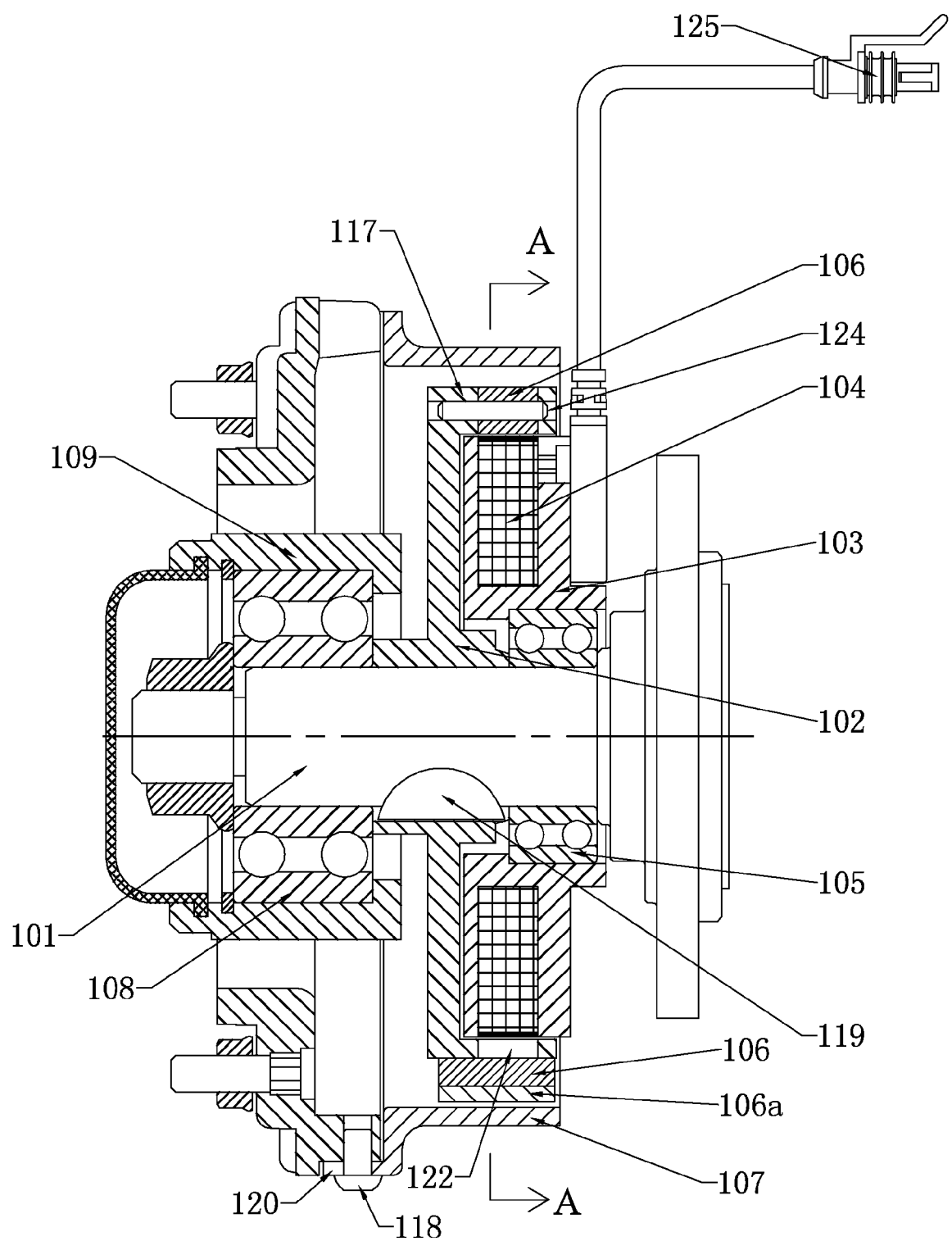
FIG. 2 is a main sectional view of Embodiment 1.
Figure 3:
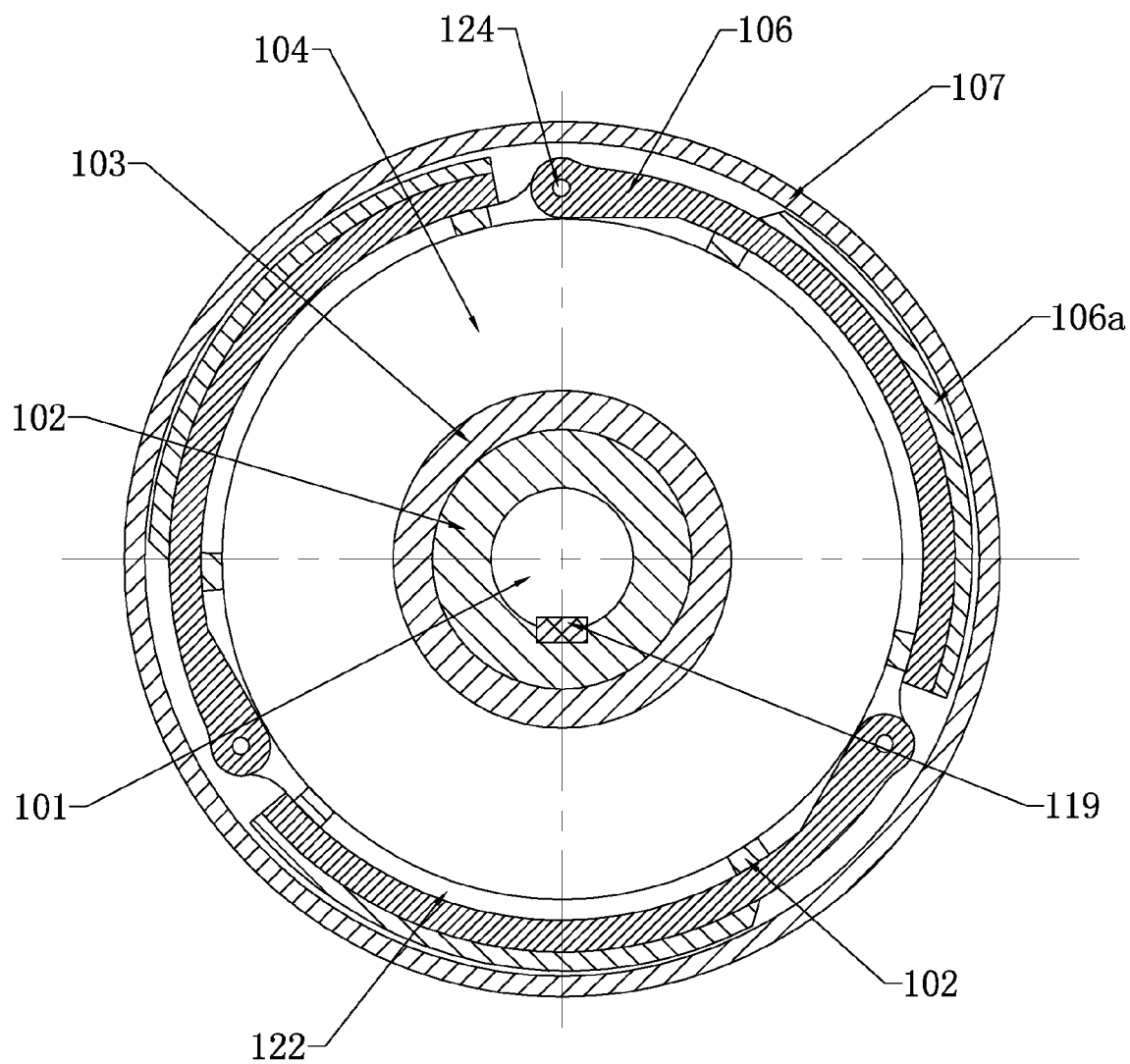
FIG. 3 is a sectional view of FIG. 2 in a direction of line A-A.
Figure 4:
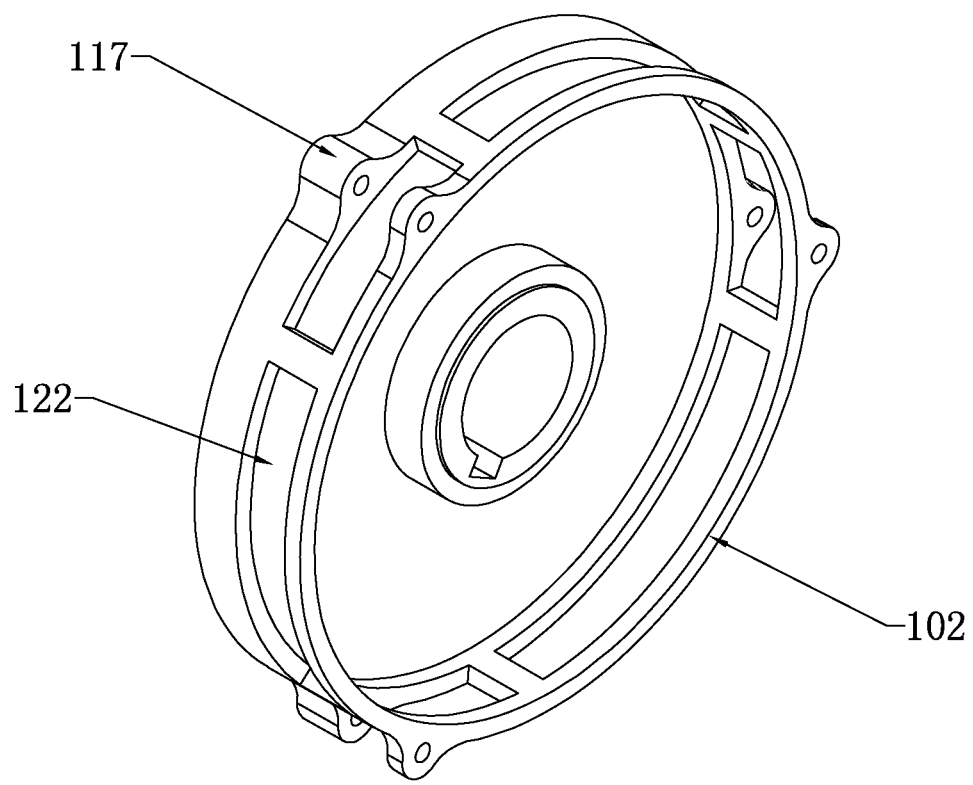
FIG. 4 is a stereoscopic diagram of a driving disc in Embodiment 1.
Figure 5:
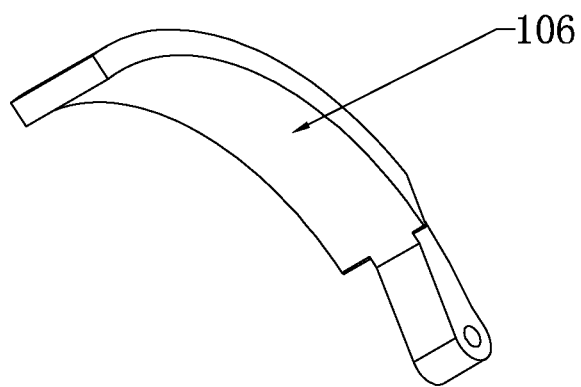
FIG. 5 is a stereoscopic diagram of a driving plate in Embodiment 1.
Figures 9, 10:
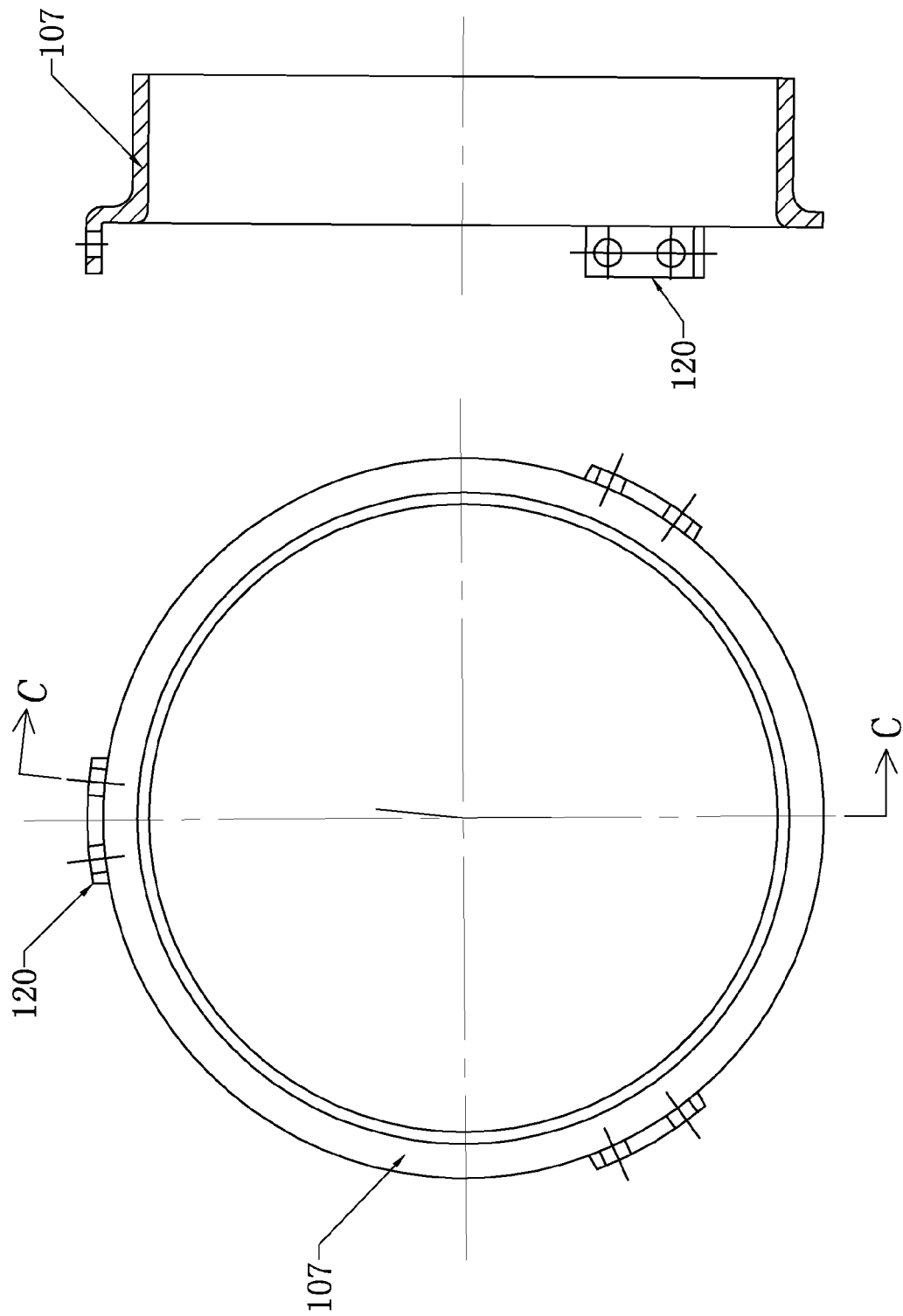
FIG. 9 is a right view of a driving cylinder in Embodiment 1.
FIG. 10 is a sectional view of FIG. 9 in a direction of line C-C.

As shown in FIG. 2, an electromagnetic driving device comprises a driving disc 102 (as shown in FIG. 4), and further comprises a first driving device, a second driving device and a first electrical control device, as shown in FIGS. 3, 7 and 8, wherein the first driving device comprises three driving plates 106. The three driving plates 106 are hinged to protrusions 117 on a circumference of the driving disc 102 via pin shafts 124. The driving plates 106 are arc in shape (as shown in FIG. 5). On outer surfaces of the driving plates 106, are provided arc friction plates 106a bonded to the driving plates 106 via pressing. The second driving device is a driving cylinder 107 (as shown in FIGS. 9 and 10). The driving cylinder 107 has an end face opposite to the driving disc 102 outside the circumference of the driving disc 102. A space is provided between the driving cylinder 107 and the friction plates 106a. The first electrical control device comprises an electromagnet assembly consisting of an electromagnetic iron core 103 and a coil 104. The electromagnet assembly is located in an inner cavity of the driving disc 102, wherein the electromagnetic iron core 103 is mounted on a driving shaft 101 via a second bearing 105 and is in flexible connection with an engine body via a fixed hose. Both the driving disc 102 and the driving plates 106 are made of a magnetic conductive material. As shown in FIGS. 2 and 4, six sets of magnetic insulation grooves 122 are provided on the circumference of the driving disc 102.

As shown in FIGS. 4, 7 and 8, three protrusions 117 are provided on the circumference of the driving disc 102, and are uniformly distributed on the circumference of the driving disc 102. The three driving plates 106 are hinged to the three protrusions 117 via pins 124. The driving plates 106 are able to rotate to be away from or close to the circumference of the driving disc 102 via the pins 124.

Figure 1:
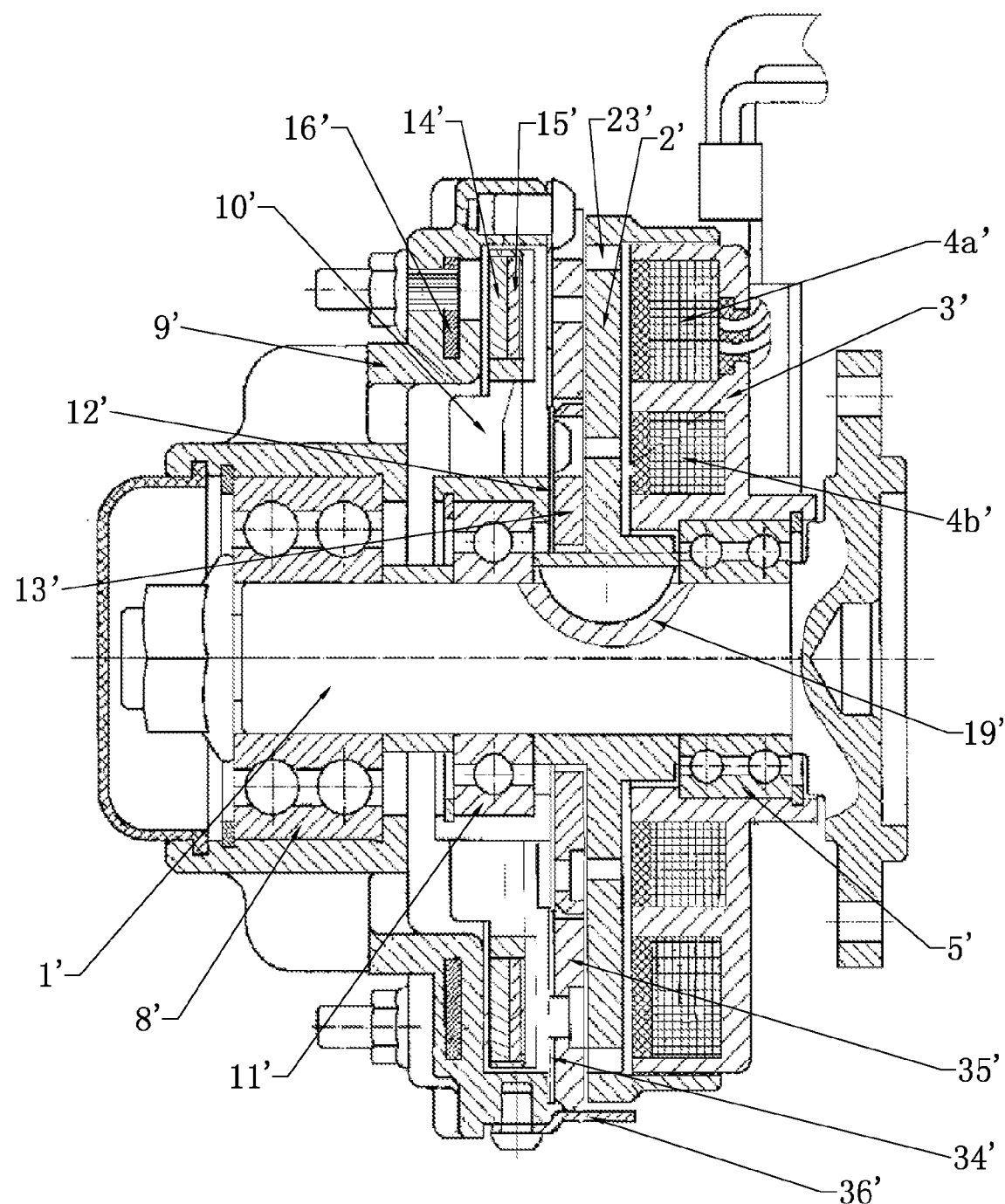
FIG. 1 is a main sectional view of a three-speed electromagnetic fan clutch in the prior art.
Figure 6A:
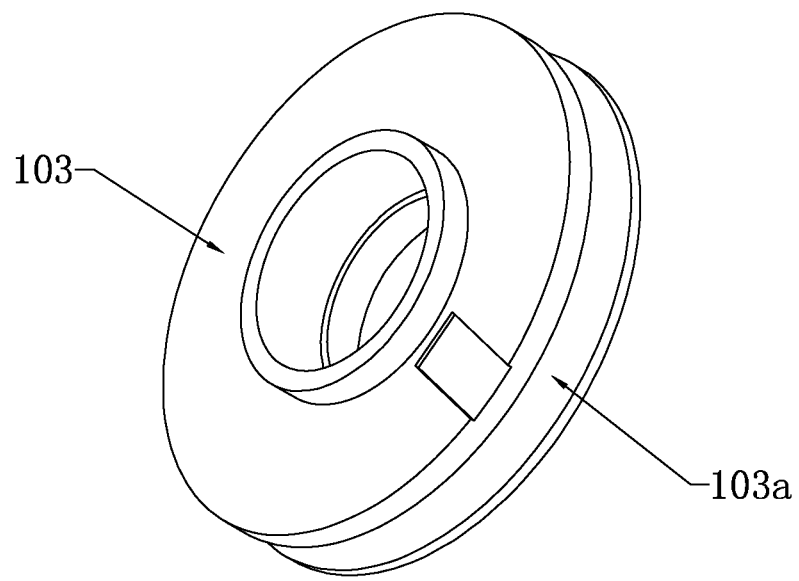
FIG. 6a and FIG. 6b are stereoscopic diagrams of an electromagnetic iron core in Embodiment 1.
Figure 6B:
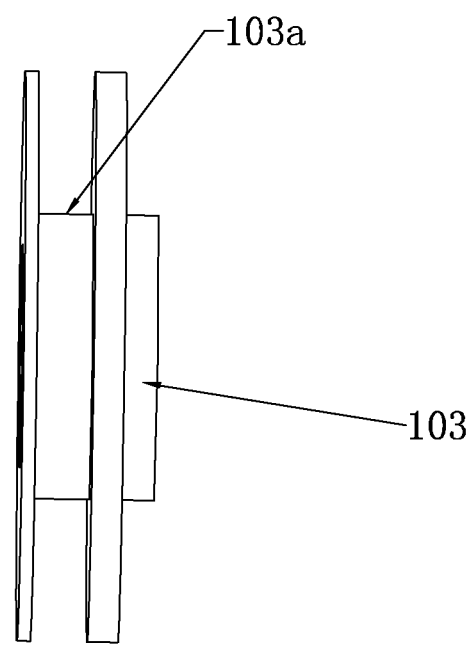

The electromagnetic driving device further comprises a driven device, which is a fan fixing disc 109, as shown in FIG. 1. The fan fixing disc 109 is mounted on the driving shaft 101 via a first bearing 108. In combination with FIG. 9 and FIG. 10, three sets of fixing plates 120 at one end of the driving cylinder 107 are fixed on the fan fixing disc 109 via fastening bolts 118. The driving disc 102 is fixedly mounted on the driving shaft 101 via a half round key 119. In an inner cavity of the driving disc 102, the electromagnetic iron core 103 is mounted on the driving shaft 101 via the second bearing 105. In combination with FIG. 6a and FIG. 6b, the coil 104 is disposed in a coil inlay slot 103a provided on the electromagnetic iron core 103. A direction of a magnetic conductive opening of the coil inlay slot 103a is directed to the circumference of the driving disc 102.

When the first electrical control device (the coil 104) is energized, the first electrical control device (the electromagnetic iron core 103 with a magnetic attraction force) drives the first driving device (the driving plates 106 with the friction plates 106a bonded to the outer surfaces) such that the second driving device (the driving cylinder 107) is disengaged from the power of the driving disc 102 (the driving plates 106 are sucked outside the end face where the circumference of the driving disc 102 is located, and are disengaged from the driving cylinder 107). When the first electrical control device (the coil 104) is de-energized, the first electrical control device (the electromagnetic iron core 103 without the magnetic attraction force) drives the first driving device (the driving plates 106 with the friction plates 106a bonded to the outer surfaces) such that the second driving device (the driving cylinder 107) is engaged with the power of the driving disc 102 (the driving plates 106 hinged to the driving disc 106 compress the driving cylinder 107 via the friction plates 106a due to a centrifugal force).

As shown in FIG. 2, the specific working process of the electromagnetic driving device according to the present invention in a single-speed electromagnetic fan clutch is as below.

After an engine is started, the engine drives a main shaft 101 to rotate, and the main shaft 101 drives the driving disc 102 to rotate at a full speed via the half round key 119.

When a water temperature of the engine does not reach a first set value 82° C. of a temperature controlled switch 125, the temperature controlled switch 125 controls a circuit of the coil 104 to be in an on state. At this time, the driving plates 106 connected with the friction plates 106a will be firmly sucked onto the driving disc 102 by a radial suction magnetic field generated by the electromagnetic iron core 103, the friction plates 106a are not in contact with the driving cylinder 107, and the fan fixing disc 109 and the driving cylinder 107 connected thereto slide and rotate freely via the first bearing 108.

When the water temperature rises to the first set value 82° C. of the temperature controlled switch 125, the temperature controlled switch 125 controls the circuit of the coil 104 to be de-energized. The three driving plates 106 compress the driving cylinder 107 via the friction plates 106a under action of a centrifugal force such that the driving cylinder 107 is allowed to rotate with the driving disc 102 at a same speed. The driving cylinder 107 drives a fan on the fan fixing disc 109 to rotate, thereby achieving forceful cooling effect. If the coil 104 is de-energized because a power supply system malfunctions suddenly in the running process of an automobile, the electromagnetic iron core 103 has no magnetism and will not suck the three driving plates 106, and the three driving plates 106 compress the driving cylinder 107 via the friction plates 106a due to the centrifugal force such that the driving cylinder 107 and the driving disc 102 rotate at a same speed, thereby achieving the same forceful cooling effect.

According to the present invention, a method for manufacturing the above electromagnetic driving device (applied in a single-speed electromagnetic fan clutch) is provided, comprising steps of: (a) casting the driving disc 102 and machining, wherein three sets of the protrusions 117 are provided outside the circumference of the driving disc 102; (b) casting the first driving device, i.e., the three arc driving plates 106, and machining; (c) casting the second driving device, i.e., the driving cylinder 107, and machining; (d) casting the electromagnetic iron core 103 in the first electrical control device and machining, and mounting the coil 104 in the coil inlay slot 103a on the electromagnetic iron core 103 in a flat winding manner; (e) mounting the driving disc 102 on the driving shaft 101 via the half round key 119, hinging the three driving plates 106 onto the corresponding protrusions 117 of the driving disc 102 via the pin shafts 124, mounting the electromagnetic iron core 103 on the driving shaft 101 via the second bearing 105 and locating the electromagnetic iron core 103 in the inner cavity of the end face where the circumference of the driving disc 102 is located, mounting the fan fixing disc 109 (the driven device) on the driving shaft 101 via the first bearing 108, mounting the driving cylinder 107 on the fan fixing disc 109 via the bolts through the three sets of fixing plates 120, wherein the driving cylinder 107 after being mounted has the opposite end face outside the end face where the circumference of the driving disc 102 is located, and the space is provided between the driving plates 106 and the opposite end face of the driving cylinder 107, such that:

when the coil 104 is energized, the driving plates 106 are sucked onto the end face outside the circumference of the driving disc 102 by the electromagnetic iron core 103 such that the driving cylinder 107 is disengaged from the driving disc 102; and when the coil 104 is de-energized, the driving plates 106 are not sucked by the electromagnetic iron core 103, and the driving plates 106 compress the driving cylinder 107 under the action of the centrifugal force, such that the driving cylinder 107 is engaged with the power of the driving disc 102 via the driving plates 106, and the driving disc 102 is allowed to drive the fan fixing disc 109 to rotate via the driving plates 106 and the driving cylinder 107.

According to the present invention, a method for controlling the above electromagnetic driving device (applied in a single-speed electromagnetic fan clutch) is provided, comprising steps of:

controlling the circuit of the coil 104 to be on by the temperature sensor 125 when the water temperature of the engine is less than the first set value 82° C., wherein, the coil 104 is energized, and the electromagnetic iron core 103 has magnetism; and controlling the circuit of the coil 104 to be de-energized by the temperature sensor 125 when the water temperature of the engine reaches the first set value 82° C. or continues to rise, wherein, the coil 104 is de-energized, and the electromagnetic iron core 103 has no magnetism.

Embodiment 2

Figure 11:
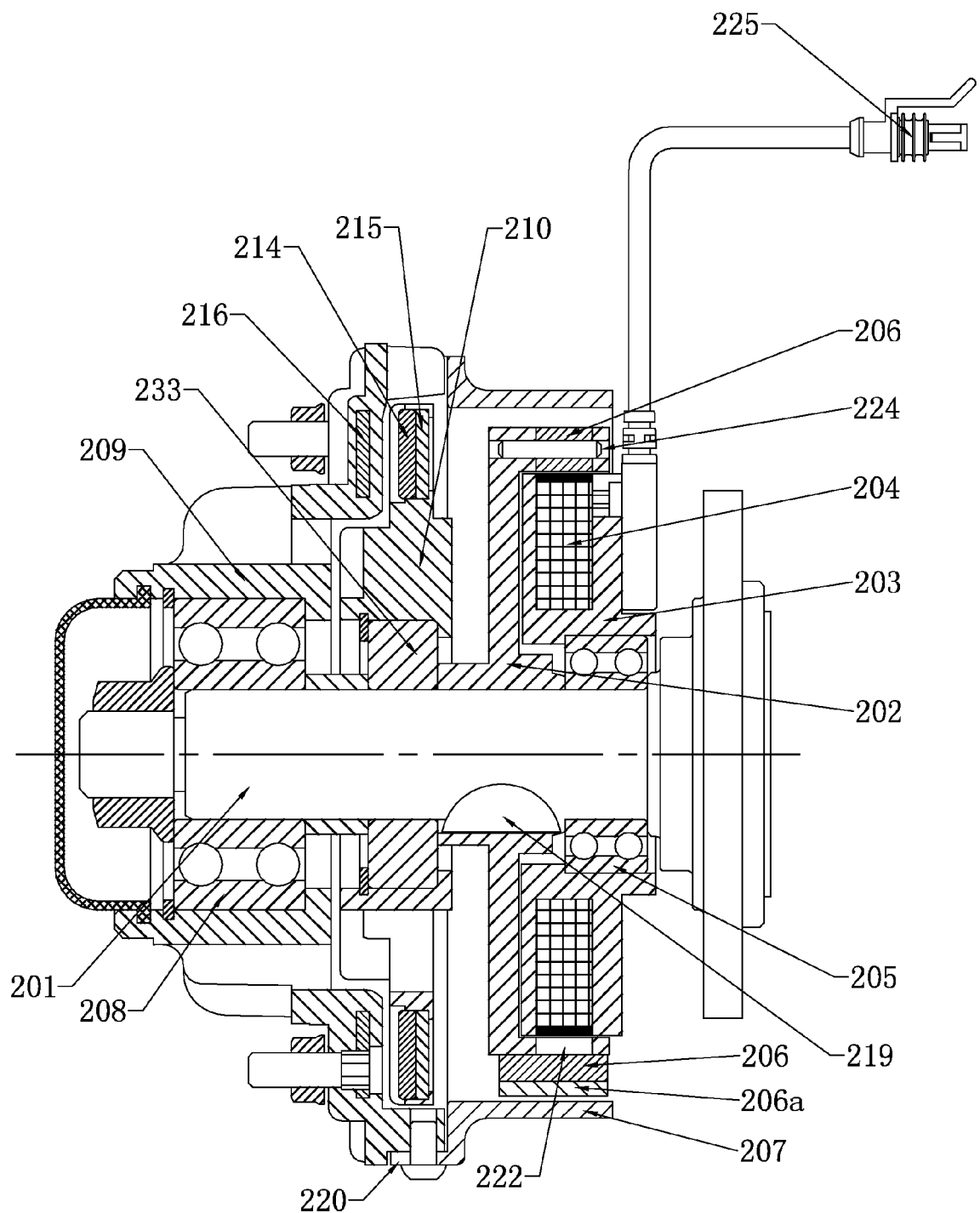
FIG. 11 is a main sectional view of Embodiment 2.

As shown in FIG. 11, under the premise of not changing other structures in Embodiment 1 as shown in FIGS. 2-10, differences in structure between the two-speed electromagnetic fan clutch in this embodiment and the electromagnetic fan clutch in Embodiment 1 lie in that: the two-speed electromagnetic fan clutch further comprises a magnet fixing disc 210 which is located in an inner cavity of a fan fixing disc 209 and mounted on a driving shaft 201 via a driving sleeve 233; a number of soft magnets 215 are inlaid at positions on an end face of the magnet fixing disc 210 opposite to the fan fixing disc 209; permanent magnets 214 are magnetically sucked onto the first soft magnets 215; and second soft magnets 216 are inlaid at positions on the fan fixing disc 209 corresponding to the permanent magnets 214.

As shown in FIG. 11, the specific working process of the electrometric driving device according to the present invention in a two-speed electromagnetic fan clutch is as below.

After an engine is started, the engine drives a main shaft 201 to rotate, and the main shaft 201 drives the driving disc 202 to rotate at a full speed via a half round key 219 and also drives the magnet fixing disc 210 to rotate at a full speed via the driving sleeve 233.

When a water temperature of the engine does not reach a first set value 82° C. of a temperature controlled switch 225, the temperature controlled switch 225 controls a circuit of a coil 204 to be in an on state. Three driving plates 206 connected with friction plates 206a are firmly sucked onto the driving disc 202 by a radial suction magnetic field generated by the electromagnetic iron core 203. The friction plates 206a are not in contact with a driving cylinder 207, so the fan fixing disc 209 will not be driven to rotate. Meanwhile, the second soft magnets 216 perform relative rotation within a magnetic field formed by the permanent magnets 214 and the first soft magnets 215. The second soft magnets 216 cut magnetic lines of force to generate eddy current and the eddy current generates a new magnetic field, so that the magnet fixing disc 210 drives the fan fixing disc 209 to rotate at a differential rate due to a magnetic effect, that is, the flexible connection and middle-speed rotation of the fan fixing disc 209 and the magnet fixing disc 210 play a role of primary heat dissipation and cooling, so that the engine of an automobile is maintained at a proper working temperature.

When the water temperature of the engine rises to the first set value 82° C. of the temperature controlled switch 225, the temperature controlled switch 225 controls the circuit of the coil 204 to be off. The three driving plates 206 compress the driving cylinder 207 via the friction plates 206a under action of a centrifugal force such that the driving cylinder 207 and the driving disc 202 rotate at a same speed. The driving cylinder 207 drives a fan on the fan fixing disc 209 to rotate, thereby achieving forceful cooling effect. If the coil 204 is de-energized because a power supply system malfunctions suddenly in the running process of an automobile, the electromagnetic iron core 203 has no magnetism and will not suck the three driving plates 206 because the coil 204 is de-energized, and the three driving plates 206 compress the driving cylinder 207 via the friction plates 206a due to the centrifugal force, such that the driving cylinder 207 and the driving disc 202 rotate at a same speed, thereby achieving the same forceful cooling effect.

Similar to the corresponding structures in Embodiment 1, in FIG. 11, 224 refers to pin shaft, 205 refers to second bearing, 208 refers to first bearing, 220 refers to fixing plate on the driving cylinder 201, and 222 refers to magnetic insulation groove provided on the opposite end face of the driving disc 202.

The positions of the permanent magnets 214, the first soft magnets 215 and the second soft magnets 216 on the magnet fixing disc 210 and the fan fixing disc 209 are not limited to the above condition, as long as the magnet fixing disc 210 is allowed to drive the fan fixing disc 209 to rotate due to magnetic effect. For example, the first magnets 215 and the permanent magnets 214 may be mounted on the fan fixing disc 209, and the second soft magnets 216 may be mounted on the magnet fixing disc 210.

According to the present invention, a method for manufacturing the above electromagnetic driving device (applied in a two-speed electromagnetic fan clutch) is provided. This manufacturing method is basically similar to that in Embodiment 1. The differences therebetween lie in that: the magnet fixing disc 210 is cast and machined, the magnet fixing disc 210 is fixedly mounted on the driving shaft 201 via the driving sleeve 233 and located in the inner cavity of the fan fixing disc 209 before the fan fixing disc 209 (the driven device) is mounted, and the end face of the magnet fixing disc 210 where the first soft magnets 215 and the permanent magnets 214 are inlaid is corresponding to the end face of the fan fixing disc 209 where the second soft magnets 216 are inlaid.

A method for controlling the above electromagnetic driving device (applied in a two-speed electromagnetic fan clutch) according to the present invention is the same as the controlling method in Embodiment 1.

Embodiment 3

Figure 12:
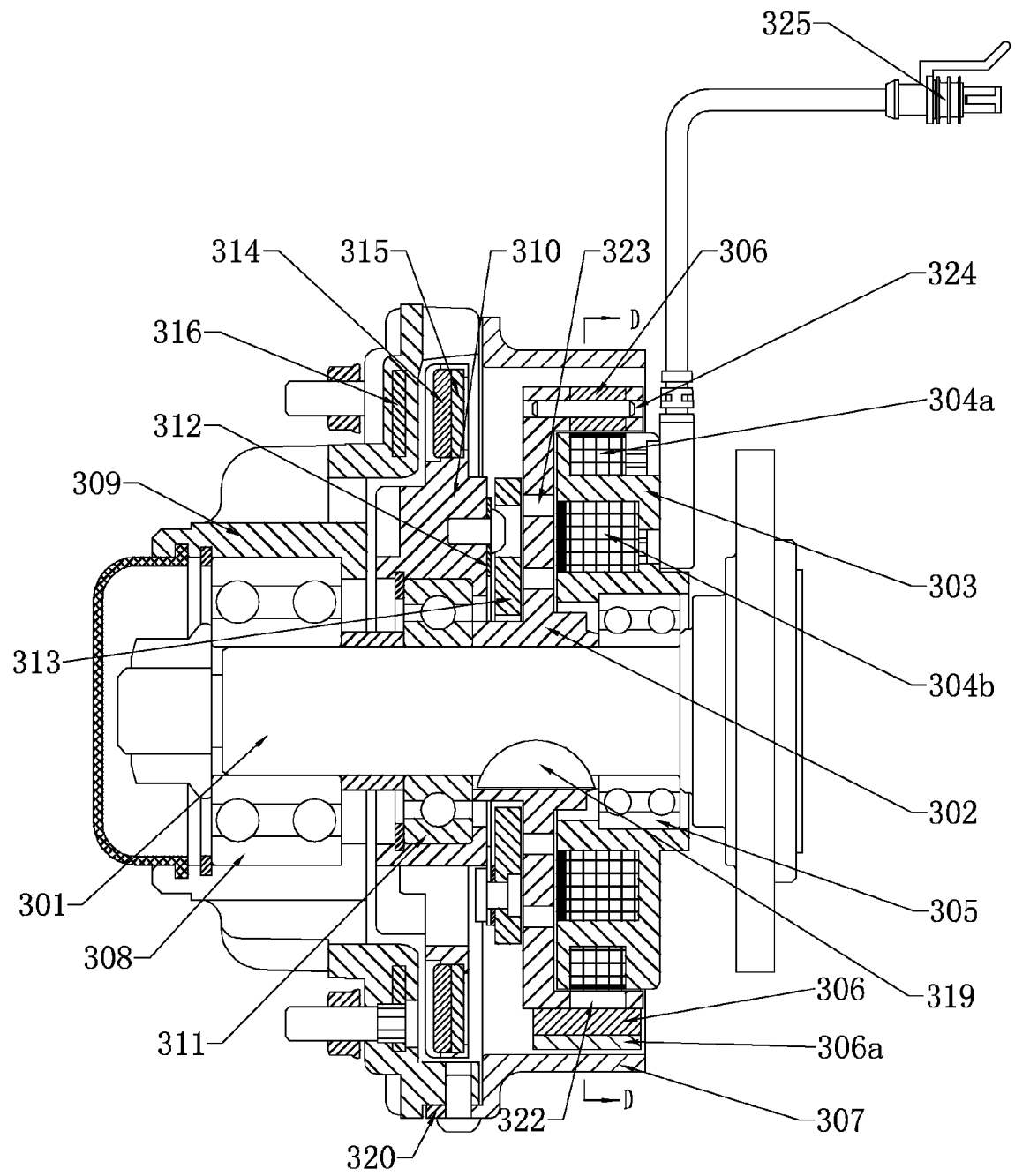
FIG. 12 is a main sectional view of Embodiment 3.
Figure 15:
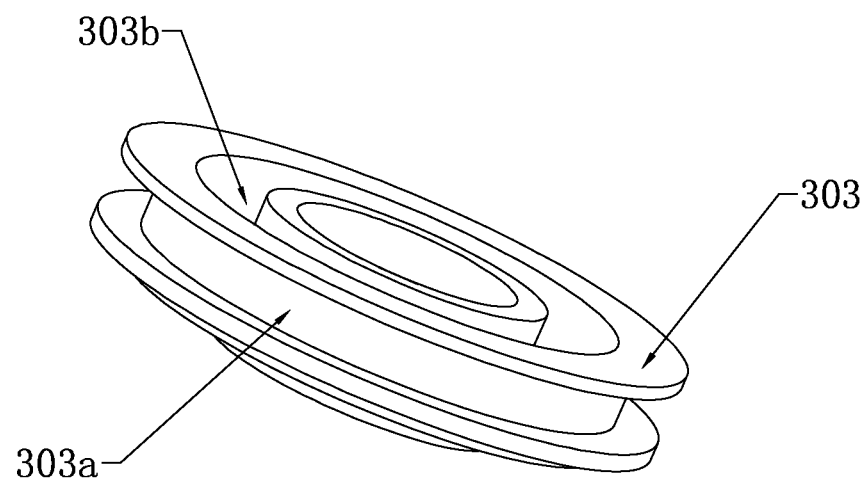
FIG. 15 is a stereoscopic diagram of an electromagnetic iron core in Embodiment 3.

As shown in FIG. 12, under the premise of not changing other structures in Embodiment 2 as shown in FIG. 11, differences in structure between the three-speed electromagnetic fan clutch in this embodiment and the electromagnetic fan clutch in Embodiment 1 lie in that: a magnet fixing disc 310 is mounted on a driving disc 302 via a third bearing 311 (instead of the driving sleeve 233 in Embodiment 2); an electromagnetic iron core 303 is provided thereon with inner and outer coil inlay slots 303a and 303b (as shown in FIG. 15); an outer coil 304a (the first electrical control device having the same function as the coil 204 in Embodiment 2) is mounted in the outer coil inlay slots 303a; a direction of magnetic conductive openings of the outer coil inlay slots 303a is directed to a circumference of the driving disc 302; an inner coil 304b (the second electrical control device) is provided in the inner coil inlay slots 303b; a direction of magnetic conductive openings of the inner coil inlay slots 303b is directed to the magnet fixing disc 310 in an axial direction; a small suction disc 313 is supported and connected at a position on the magnet fixing disc 310 corresponding to the inner coil 304b via a small spring sheet 312; and the small suction disc 313 is close to the driving disc 302 and has a space with an opposite end face of the driving disc 302. When the inner coil 304b (the second electrical control device) is energized, the electromagnetic iron core 303 generates an axial magnetic attraction force and sucks the small suction disc 313 onto the driving disc 302 via the driving disc 302, such that the magnet fixing disc 310 is engaged with the driving disc 302, and the power of the driving disc 302 is directly transferred to the magnet fixing disc 310.

Figure 13:
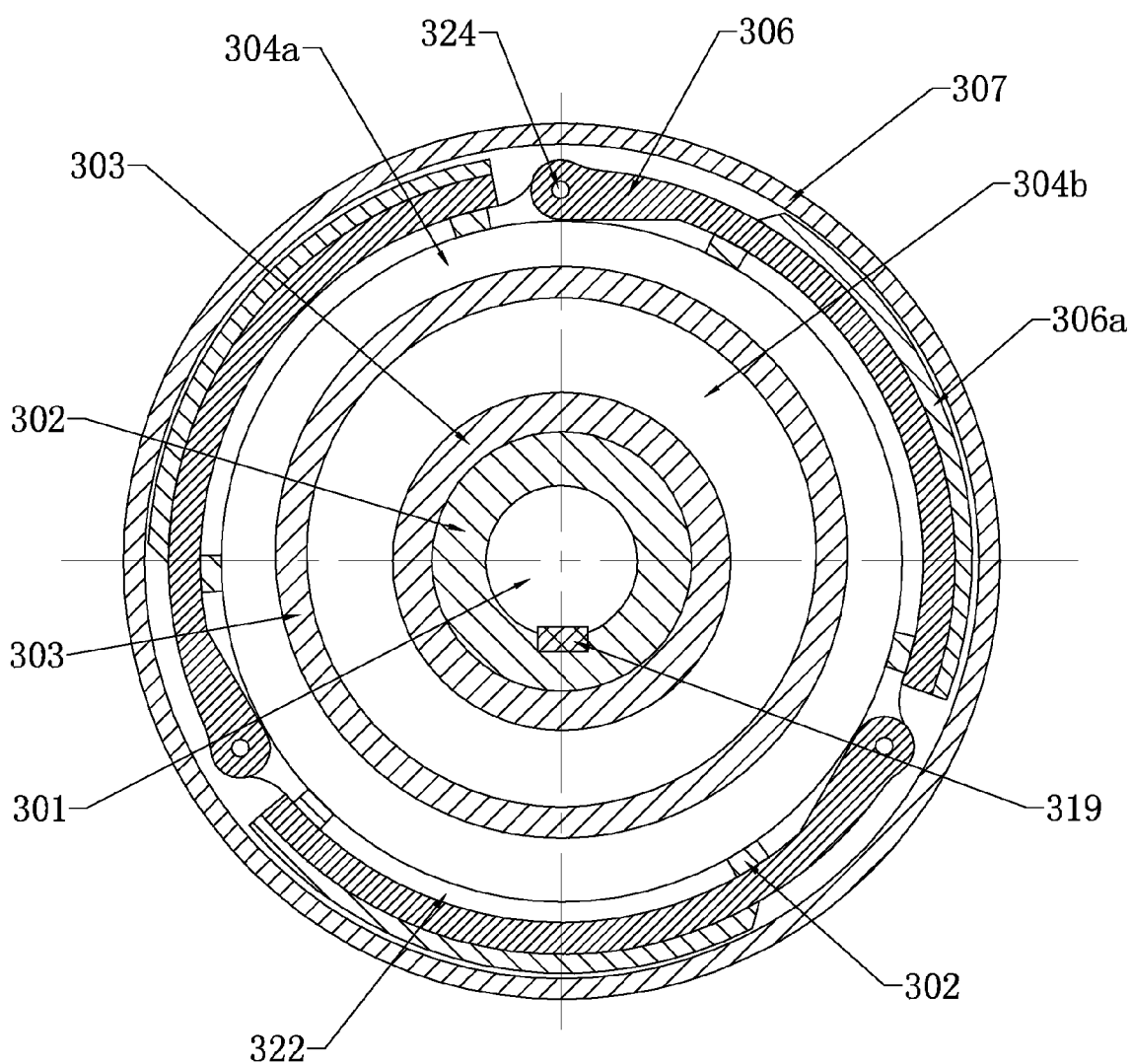
FIG. 13 is a sectional view of FIG. 12 in a direction of line D-D.
Figure 14:
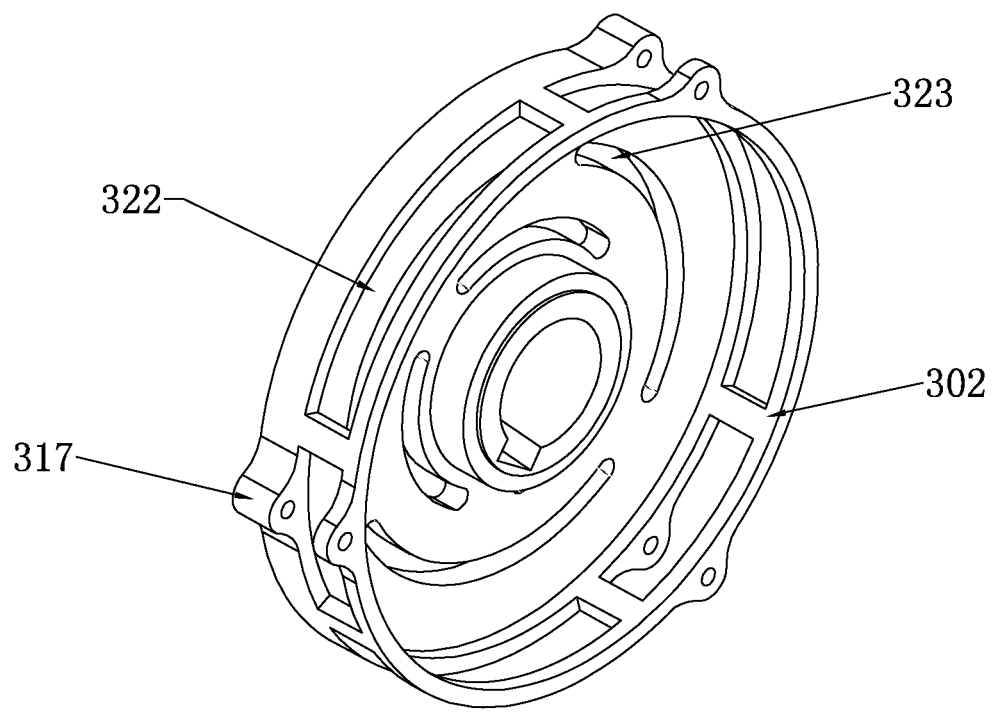
FIG. 14 is a stereoscopic diagram of a driving disc in Embodiment 3.

As shown in FIG. 14, six sets of inner magnetic insulation grooves 323 are provided on one side of the driving disc 302, and six sets of outer magnetic insulation grooves 322 are provided on an end face where the circumference of the driving disc 302 is located. As shown in FIG. 13, on outer surfaces of driving plates 306, are provided a layer of friction plates 306a bonded to the driving plates 306 via pressing. With a large friction coefficient, the friction plates 306a are able to drive the driving cylinder 307 to rotate. Wear-resistant treatment is performed on the surface of the driving cylinder 307 opposite to the friction plates 306a, such that the driving effect between the friction plates 306a and the driving cylinder 307 is better. When the outer coil 304a is de-energized, the driving plates 306 is able to compress the driving cylinder 307 via the friction plates 306a under action of a centrifugal force and drive a fan fixing disc 309 to rotate at a full speed via the driving cylinder 307, thereby achieving the effect of cooling an engine at a full speed.

As shown in FIGS. 16 and 17, three protrusions 317 are provided on the circumference of the driving disc 302, and are uniformly distributed on the circumference of the driving disc 302. The three driving plates 306 are hinged to the three protrusions 317 via pins 324.

As shown in FIG. 12, the specific working process of the electromagnetic driving device according to the present invention in a three-speed electromagnetic fan clutch is as below.

After an engine is started, the engine drives a main shaft 301 to rotate, and the main shaft 301 drives the driving disc 302 to rotate at a full speed via a half round key 319.

When a water temperature of the engine does not reach a second set value 82° C. of a temperature controlled switch 325, the temperature controlled switch 325 controls a circuit of the outer coil 304a to be on. The three driving plates 306 connected with the friction plates 306a are firmly sucked onto the driving disc 302 via a radial suction magnetic field generated by the electromagnetic iron core 303. The friction plates 306a are not in contact with the driving cylinder 307. The fan fixing disc 309 slides and rotates freely via a first bearing 308. The inner coil 304b is maintained in an off state. The driving disc 302 does not suck the small suction disc 313. The driving disc 302 is maintained to be disengaged from the magnet fixing disc 310. The magnet fixing disc 310 slides and rotates freely via a third bearing 311.

When the water temperature rises to the second set value 82° C. of the temperature controlled switch 325, the temperature controlled switch 325 controls the circuit of the inner coil 304b to be on. The electromagnetic iron core 303 generates an axial suction magnetic field to suck the small suction disc 313 onto the driving disc 302 so that the small suction disc 313 synchronously rotates with the driving disc 302. The small suction disc 313 drives the magnet fixing disc 310 to rotate via the small spring sheet 312. Second soft magnets 316 inlaid in the fan fixing disc 307 perform relative rotation in a magnetic field formed by permanent magnets 314 and first soft magnets 315. The second soft magnets 316 cut magnetic lines of a force to generate an eddy current, and the eddy current generates a new magnetic field, so that the magnet fixing disc 310 drives the fan fixing disc 309 to rotate at a differential rate due to a magnetic field force, that is, the flexible connection and middle-speed rotation of the fan fixing disc 309 and the magnet fixing disc 310 play a role of primary heat dissipation and cooling, so that the engine of the vehicle is maintained at a proper working temperature.

If the water temperature of the engine continues to rise to a third set value 88° C. of the temperature controlled switch 325, the temperature controlled switch 325 controls the power supply of the outer coil 304a to be off. The three driving plates 306 compress the driving cylinder 307 via the friction plates 306a under the action of the centrifugal force such that the driving cylinder 307 and the driving disc 302 rotate at a same speed. The driving cylinder 307 drives a fan on the fan fixing disc 309 to rotate, thereby achieving forceful cooling effect.

If the outer coil 304a is de-energized because a power supply system malfunctions suddenly in the running process of an automobile, the electromagnetic iron core 303 has no magnetism and will not suck the three driving plates 306 because the outer coil 304a is de-energized, and the three driving plates 306 compress the driving cylinder 307 via the friction plates 306a under the action of the centrifugal force such that the driving cylinder 307 and the driving disc 302 rotate at a same speed, thereby achieving the same forceful cooling effect.

Similar to the corresponding structures in Embodiment 2, in FIG. 12, 305 refers to second bearing, and 302 refers to fixing plate on the driving cylinder 301.

By employing the above structure, three-speed cooling is realized, and it is also ensured that the fan fixing disc rotates for cooling to avoid too high temperature of the engine in the case of a sudden power cut. The device is able to avoid fan stalling caused by the failure of an electromagnetic clutch in the prior art, so the device is more safe and realizable in use.

According to the present invention, a method for manufacturing the above electromagnetic driving device (applied in a three-speed electromagnetic fan clutch) is provided. This manufacturing method is basically similar to that in Embodiment 2 (wherein the outer coil 304a has the same function as the coil 204 in Embodiment 2). The difference between this manufacturing method and the manufacturing method in Embodiment 2 lies in that: the magnet fixing disc 310 is mounted on the driving shaft 301 via a third bearing 311, the second electrical control device (the inner coil 304b, provided on the electromagnetic iron core 303) is added, and the small suction disc 313 is supported and connected at a position on the magnet fixing disc 310 corresponding to the inner coil 304b via the small spring sheet 312.

According to the present invention, a method for controlling the above electromagnetic driving device (applied in a three-speed electromagnetic fan clutch) is provided, comprising steps of:

controlling the outer coil 304a to be on and the inner coil 304b to be maintained in an off state by the temperature sensor 325 when the water temperature of the engine is less than the second set value 82° C., wherein, an end face of the electromagnetic iron core 303 directed to the circumference of the driving disc 302 has magnetism while an end face thereof directed to the small suction disc 313 has no magnetism;

controlling the circuit of the outer coil 304a to be in an on state and the inner coil 304b to be energized by the temperature sensor 325 when the water temperature of the engine is equal to or more than the second set value 82° C. but less than the third preset value 88° C., wherein, the end face of the electromagnetic iron core 303 directed to the circumference of the driving disc 302 has magnetism, and the end face thereof directed to the small suction disc 313 also has magnetism; and controlling the outer coil 304a to be off and the inner coil 304b to be energized by the temperature sensor 325 when the water temperature of the engine is equal to or more than the third set value 88° C., wherein, the end face of the electromagnetic iron core 303 directed to the circumference of the driving disc 302 has no magnetism, the driving plates 306 compress the driving cylinder 307 under the action of the centrifugal force so as to drive the fan fixing disc 309 to rotate at a full speed, so that the fan fixing disc 309 will rotate at a full speed no matter whether the magnet fixing disc 310 rotates or not. Therefore, the driving device is able to drive the fan fixing disc 309 to rotate at a full speed when the inner coil 304b is controlled to be energized or a sudden power cut occurs.

Embodiment 4

Figure 18:
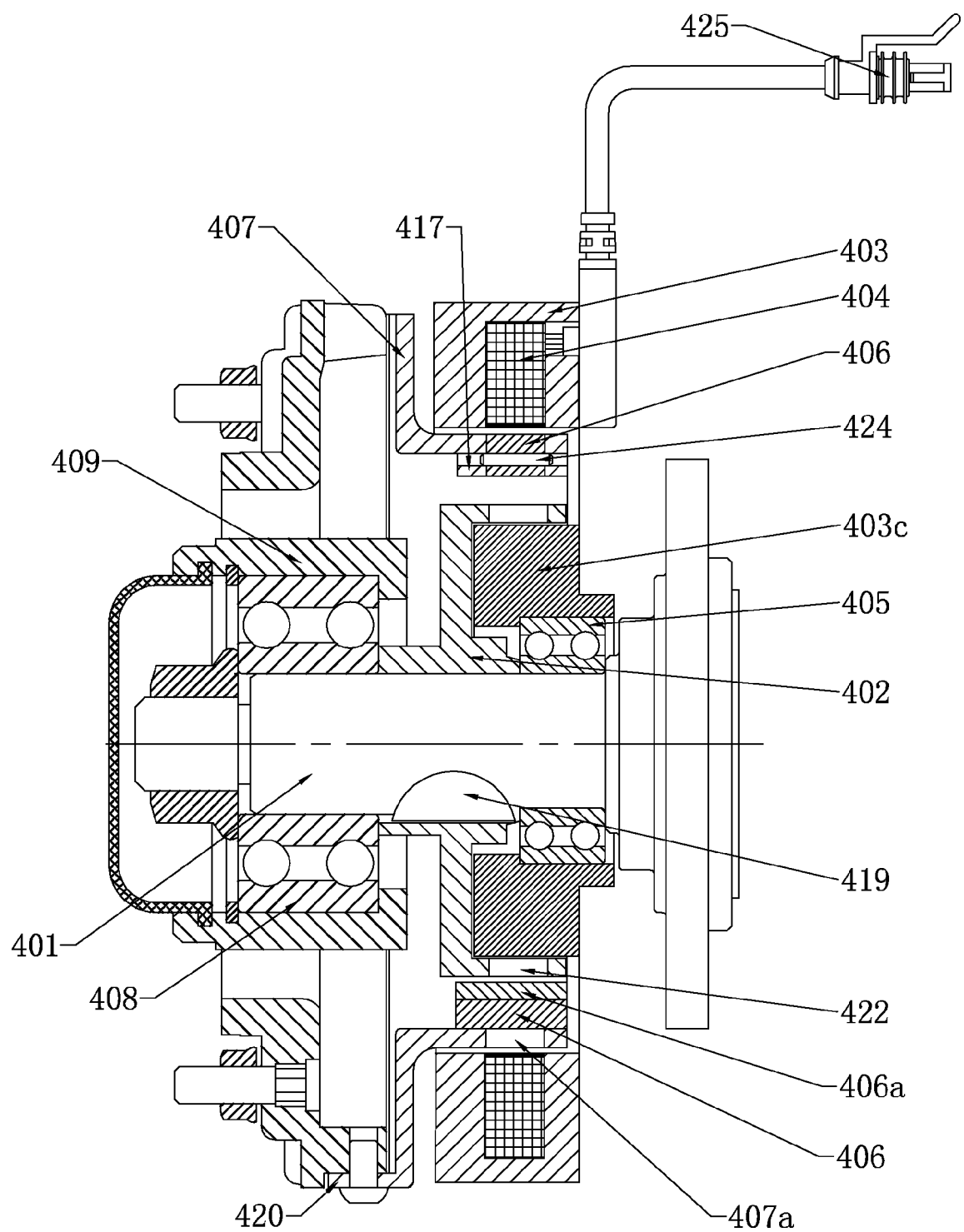
FIG. 18 is a main sectional view of Embodiment 4.

As shown in FIG. 18, under the premise of not changing other structures in Embodiment 1 as shown in FIGS. 2-10, differences in structure between the single-speed electromagnetic fan clutch in this embodiment and the electromagnetic fan clutch in Embodiment 1 lie in that: the first electrical control device comprises a permanent magnet 403c and an electromagnet assembly consisting of an electromagnetic iron core 403 and a coil 404; the permanent magnet 403c is located inside a driving cylinder 407; as shown in FIG. 18, a specific position of the permanent magnet 403c is that the permanent magnet is mounted on a driving shaft 401 via a second bearing 405 and located in an inner cavity of a driving disc 402; an end face on the permanent magnet 403c directed to a circumference of the driving disc 402 is a magnetic pole end; the electromagnetic assemblies 403, 404 are located outside the driving cylinder 407; the electromagnetic iron core 403 is in flexible connection with an engine body via a fixed hose; the first driving device comprises three driving plates 406; the driving plates 406 are rotatably connected to an end face of the driving cylinder 407 opposite to the driving disc 402 and are arc in shape; on inner surfaces of the driving plates 406, are provided a layer of arc friction plates 406a bonded to the driving plates 406 via pressing; the driving plates 406, the driving cylinder 407 and the driving disc 402 are all magnetic-conductive; and a magnetic attraction force applied by the electromagnetic iron core 403 to the driving plates 406 is larger than that applied by the permanent magnet 403c to the driving plates 406, when the coil 404 is energized.

As shown in FIG. 18, several sets of magnetic insulation grooves 422 are provided on an end face where the circumference of the driving disc 402 is located, and several sets of magnetic insulation grooves 407a are also provided on the opposite end face of the driving cylinder 407. 420 refers to fixing plate on the driving cylinder 407, and 417 refers to protrusion, on an inside end face of the driving cylinder 407, for mounting the driving plates 406 via pin shafts 424.

As shown in FIG. 18, the specific working process of the electrometric driving device according to the present invention in a single-speed electromagnetic fan clutch is as below.

After an engine is started, the engine drives a main shaft 401 to rotate, and the main shaft 401 drives the driving disc 402 to rotate at a full speed via a half round key 419.

When a water temperature of the engine does not reach a first set value 82° C. of a temperature controlled switch 425, the temperature controlled switch 425 controls a circuit of the coil 404 to be in an on state. At this time, the coil 404 in the electromagnetic iron core 403 is energized, and the magnetic attraction force applied by the electromagnetic iron core 403 to the driving plates 406 connected with the friction plates 406a is larger than that applied by the permanent magnet 403c to the corresponding driving plates 406, so the driving plates 406 connected with the friction plates 406a will be firmly sucked onto an inner wall of the driving cylinder 407 under a resultant action bias to a side of the electromagnetic iron core 403. The friction plates 406a inside the driving plates 406 are not in contact with the driving disc 402. The fan fixing disc 409 and the driving cylinder 407 connected thereto slide and rotate freely via a first bearing 408.

When the water temperature of the engine rises to the first set value 82° C. of the temperature controlled switch 425, the temperature controlled switch 425 controls the circuit of the coil 404 to be off. At this time, the electromagnetic iron core 403 does not apply the magnetic attraction force to the driving plates 406, and the three driving plates 406 are firmly sucked onto an outside end face of the circumference of the driving disc 402 under action of a magnetic field of the permanent magnet 403c, so that the driving disc 402 drives the driving cylinder 407 to rotate via the three driving plates 406, and the driving cylinder 407 further drives a fan on the fan fixing disc 409 to rotate, thereby achieving forceful cooling effect.

If a power supply system malfunctions suddenly in the running process of an automobile, the electromagnetic iron core 403 will not suck the three driving plates 406 because the coil 404 is de-energized, and the three driving plates 406 are firmly sucked onto the outside end face of the circumference of the driving disc 402 under the action of the magnetic field of the permanent magnet 403c, such that the driving disc 402 drives the driving cylinder 407 via the three driving plates 406 and further drives the fan on the fan fixing disc 409 to rotate, thereby achieving the same forceful cooling effect.

Of course, the specific position of the permanent magnet 403c is not limited to that the permanent magnet is mounted on the driving shaft 401 via the second bearing 405 as shown in FIG. 18. The permanent magnet 403c may also be inlaid outside an end face where the circumference of the driving disc 402 is located, or the driving disc 402 is directly made of a permanent magnet material.

In this embodiment, the implementation way, in which the first electrical control device in a single-speed electromagnetic fan clutch comprises a permanent magnet and an electromagnet assembly consisting of an electromagnetic iron core and a coil, is also applicable to the two-speed electromagnetic fan clutch in Embodiment 2 and the three-speed electromagnetic fan clutch in Embodiment 3. When this implementation way is applied to two-speed and three-speed electromagnetic fan clutches, structural adaptation changes are made to other components which are connected to the first electrical control device.

According to the present invention, a method for manufacturing the above electromagnetic driving device (applied in a single-speed electromagnetic fan clutch) is provided. This manufacturing method is basically similar to that in Embodiment 1. The differences therebetween lie in that: the three protrusions 417 are provided inside the opposite end face of the driving cylinder 407, the three driving plates 406 are hinged to the corresponding protrusions 417 of the driving cylinder 407 via the pin shafts 424, and a space is provided between the driving plates 406 and the outside end face of the circumference of the driving disc 402; the first electrical device in step (d) is the permanent magnet 403c and the electromagnet assembly consisting of the electromagnetic iron core 403 and the coil 404, the permanent magnet 403c is mounted on the driving shaft 401 via the second bearing 405 and located in the inner cavity of the driving disc 402, the electromagnet assembly is mounted outside the opposite end face of the driving cylinder 407, and the electromagnetic iron core 403 is fixed on an engine shell; and the magnetic attraction force applied by the electromagnetic iron core 403 to the driving plates 406 is larger than that applied by the permanent magnet 403c to the driving plates 406, when the coil 404 is energized.

A method for controlling the above electromagnetic driving device (applied in a single-speed electromagnetic fan clutch) according to the present invention is the same as the controlling method in Embodiment 1.

Embodiment 5

Figure 19:
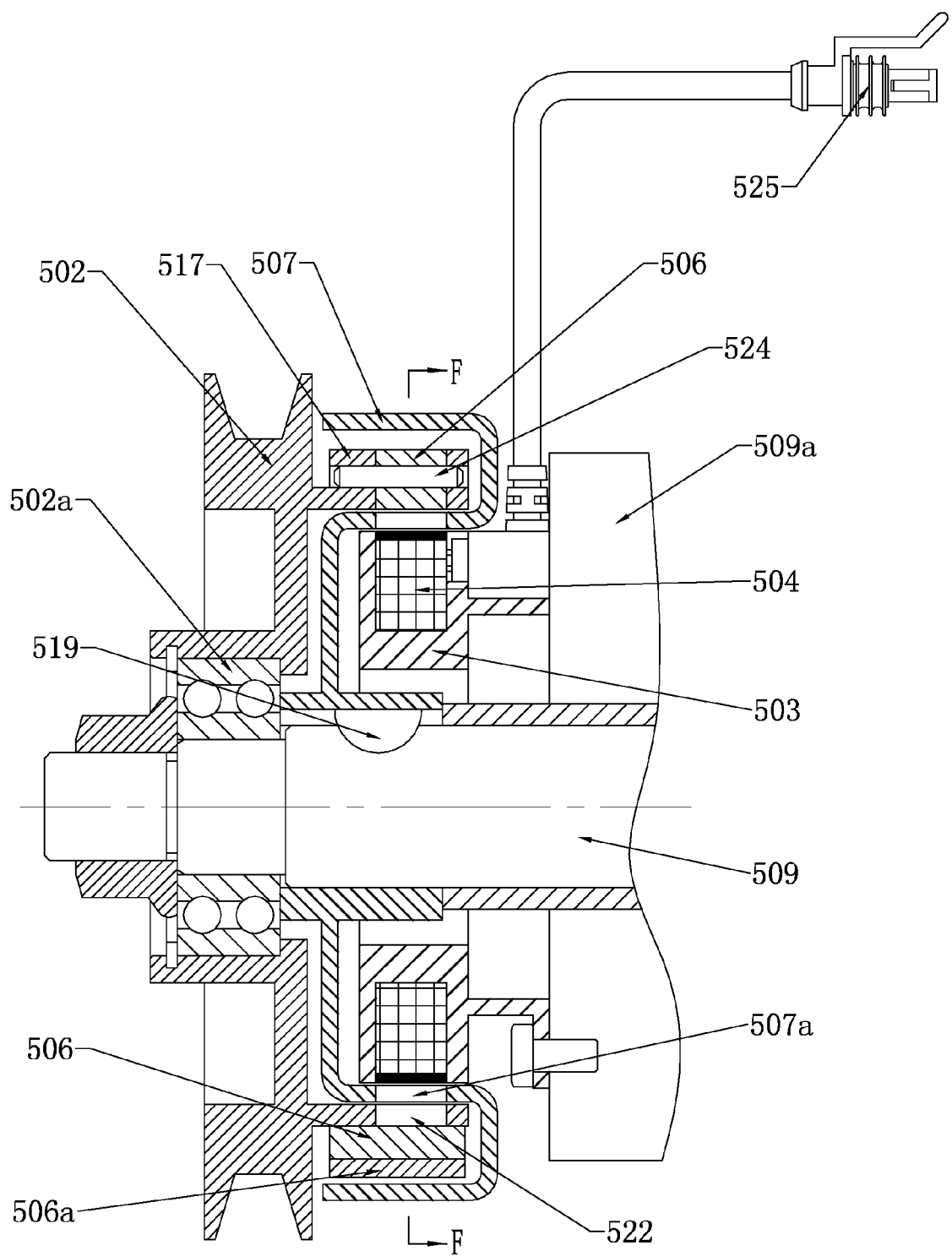
FIG. 19 is a main sectional view of Embodiment 5.
Figure 20:
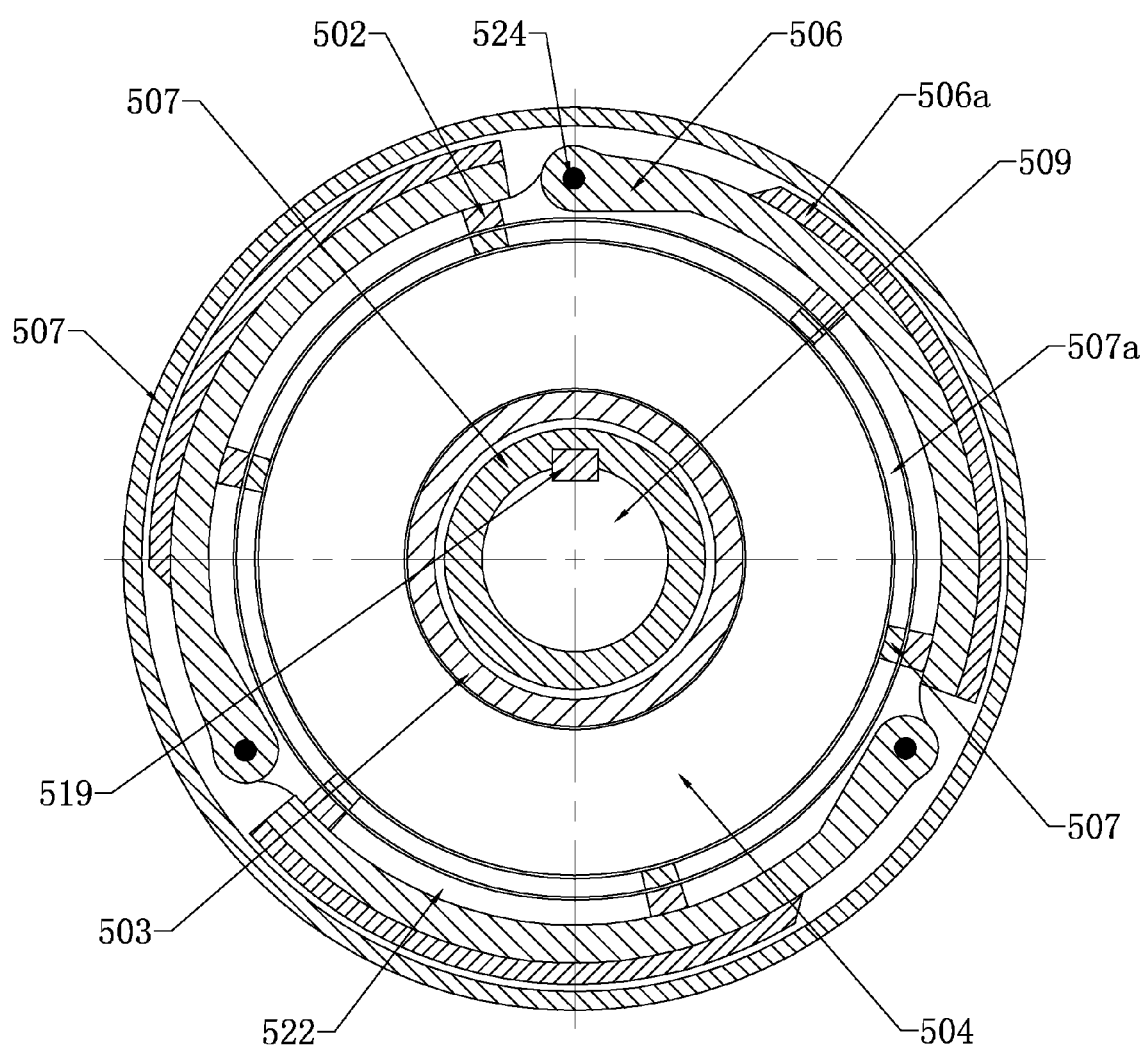
FIG. 20 is a sectional view of FIG. 19 in a direction of line F-F.
Figure 24:
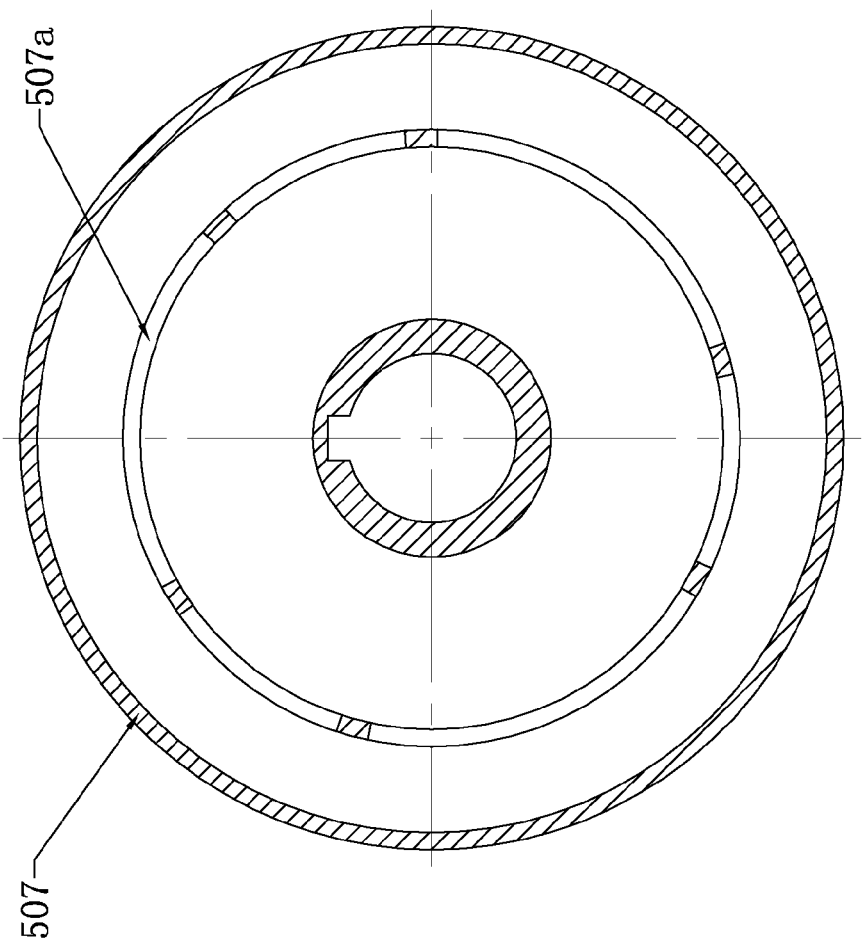
FIG. 24 is a sectional view of FIG. 23 in a direction of line H-H.
Figure 23:
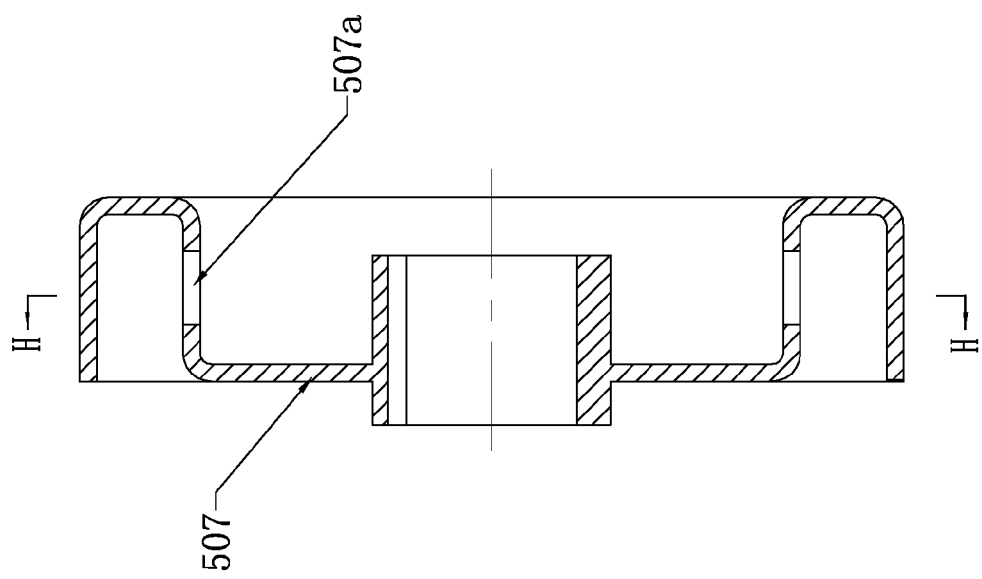
FIG. 23 is a main sectional view of a driving cylinder in Embodiment 5.

As shown in FIG. 19, an electromagnetic driving device comprises a driving disc 502 (the driving disc 502 is a belt wheel and is driven to rotate by an engine), and further comprises a first driving device, a second driving device and a first electrical control device, wherein the first driving device comprises three driving plates 506, as shown in FIGS. 20-22, the three driving plates 506 are hinged to a circumference of the driving disc 502 via pin shafts 524. The driving plates 506 are arc in shape. On outer surfaces of the driving plates 506, are provided with arc friction plates 506a bonded to the driving plates 506 via pressing. The second driving device is a driving cylinder 507 (as shown in FIGS. 23 and 24). The driving cylinder 507 has an end face opposite to the driving disc 502 outside the circumference of the driving disc 502. A space is provided between the opposite end face of the driving cylinder 507 and the friction plates 506a. The first electrical control device comprises an electromagnet assembly consisting of an electromagnetic iron core 503 and a coil 504. The electromagnet assembly is located in an inner cavity of the driving disc 502. The driving disc 502, the driving plates 506 and the driving cylinder 507 are all made of a magnetic conductive material.

As shown in FIG. 19, the electromagnetic driving device further comprises a driven device, which is an air pump spindle 509. The driving disc 502 is mounted on the air pump spindle 509 via a bearing 502a. The driving cylinder 507 is fixedly mounted on the air pump spindle 509 via a half round key 519. The electromagnetic iron core 503 is fixed on an air pump shell 509a via a fastening bolt and provided with a coil inlay slot thereon. The coil 504 is mounted in the coil inlay slot. A direction of a magnetic conductive opening of the coil inlay slot is the same as a radial divergence direction of the air pump spindle 509 and is directed to an inner side of an end face where the circumference of the driving disc 502 is located. Six sets of magnetic insulation grooves 522, opposite to the direction of the magnetic conductive openings, are provided on the end face where the circumference of the driving disc 502 is located. As shown in FIGS. 20, 23 and 24, six sets of magnetic insulation grooves 507a are also provided at positions on the driving cylinder 507 corresponding to the magnetic insulation grooves 522 on the driving disc 502.

As shown in FIGS. 21 and 22, three protrusions 517 are provided outside the circumference of the driving disc 502 in an outer circumferential direction, and one end of each of the driving plates 506 is hinged to the corresponding protrusion 517 via a pin. Wear-resistant treatment is performed on the surface of the driving cylinder 507 opposite to the driving plates.

As shown in FIG. 19, when the first electrical control device (the coil 504) is energized, the first electrical control device (the electromagnetic iron core 503 with a magnetic attraction force) drives the first driving device (the driving plates 506 with the friction plates 506a bonded to the outer surfaces) such that the second driving device (the driving cylinder 507) is disengaged from the power of the driving disc 502 (the driving plates 506 are sucked outside the circumference of the driving disc 502, and disengaged from the driving cylinder 507). When the first electrical control device (the coil 504) is de-energized, the first electrical control device (the electromagnetic iron core 503 without the magnetic attraction force) drives the first driving device (the driving plates 506 with the friction plates 506a bonded to the outer surfaces) such that the second driving device (the driving cylinder 507) is engaged with the power of the driving disc 502 (the driving plates 506 compress the driving cylinder 507 via the friction plates 506a under the action of a centrifugal force).

As shown in FIG. 19, the specific working process of the electromagnetic driving device according to the present invention in an air pump is as below.

After being started, an engine drives the driving disc 502 (the belt wheel) to rotate. When a pressure within the air pump is equal to or more than a fourth set value 6-8 kg (when a braking system can work normally), the air pump is not required to work. At this time, a pressure switch 525 controls the coil 504 to be energized, the driving plates 506 are sucked onto the outside end face of the circumference of the driving disc 502, and the friction material 506a is not in contact with the driving cylinder 507, so the driving disc 502 cannot transfer power to the air pump spindle 509 via the driving cylinder, and the air pump does not work.

When the pressure within the air pump is less than the fourth set value 6-8 kg (when the braking system cannot work normally), the pressure switch 525 controls the coil 504 to be de-energized, and the driving plates 506 compress the driving cylinder 507 under action of the centrifugal force, so that the driving cylinder 507 and the driving disc 502 rotate at a same speed, and the driving cylinder 507 drives the air spindle 509 to rotate, so that the air pump enters a working state.

When the electromagnetic clutch malfunctions in the running process to result in a sudden power cut of the coil 504, the driving plates 506 are not attracted by the electromagnetic icon core 503, and the driving plates 506 compress the driving cylinder 507 under the action of the centrifugal force, so that the driving cylinder 507 and the driving disc 502 rotate synchronously, and the driving cylinder 507 drives the air spindle 509 to rotate, so that the air pump is still able to work normally when a sudden power cut occurs.

According to the present invention, a method for manufacturing the above electromagnetic driving device (applied in an air pump) is provided. This manufacturing method is basically similar to that in Embodiment 1. The differences therebetween lie in that: the driving disc 502 is the belt wheel driven by the engine, the driven device is an air pump spindle 509, the driving disc 502 is mounted on the air pump spindle 509 via the bearing 502a, the driving cylinder 507 is fixedly mounted on the air pump spindle 509 via the half round key 519, and the electromagnetic iron core 503 is fixed on the air shell 509a via a bolt.

According to the present invention, a method for controlling the above electromagnetic driving device (applied in an air pump) is provided, comprising steps of:

controlling the coil 504 to be de-energized by the pressure switch 525 when the pressure of the air pump is less than the fourth set value 6-8 kg, wherein, the driving disc 502 transfers power to the air pump spindle 509 via the driving plates 506 and the driving cylinder 507, and the air pump works; and controlling the coil 504 to be energized by the pressure switch 525 when the pressure of the air pump is equal to or more than the fourth set value 6-8 kg, wherein, the driving plates 506 are sucked onto the outside end face of the circumference of the driving disc 502 and are not engaged with the driving cylinder 507, so the power may not be transferred to the air pump spindle 509, and the air pump does not work.

Embodiment 6

Figure 25:
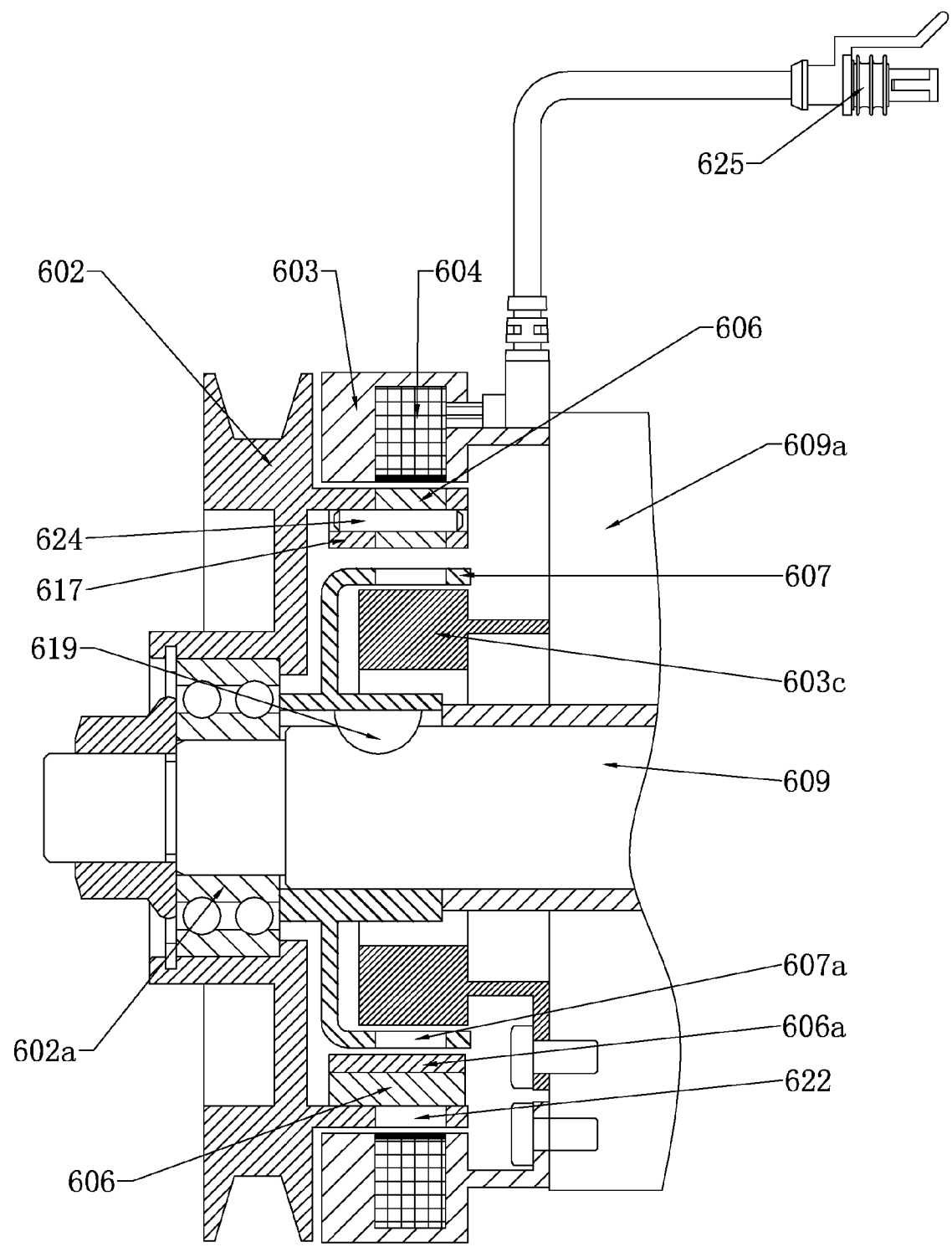
FIG. 25 is a main sectional view of Embodiment 6.

As shown in FIG. 25, under the premise of not changing other structures in Embodiment 5 as shown in FIGS. 19-24, differences in structure between the air pump in this embodiment and that in Embodiment 5 lie in that: the first electrical control device comprises a permanent magnet 603c and an electromagnet assembly consisting of an electromagnetic iron core 603 and a coil 604, the permanent magnet 603c is located in an inner cavity of a driving cylinder 607 and fixed on an air pump shell 609a via a fastening bolt, and the electromagnet assembly is located outside a circumference of the driving disc 602 and fixed on the air pump shell 609a via a fastening bolt.

As shown in FIG. 25, the first driving device comprises three driving plates 606. The driving plates 606 are hinged to protrusions 617 inside the circumference of the driving disc 602 via pin shafts 624, and are located on the driving disc 602 and an opposite end face of the driving cylinder 607. The driving plates are arc in shape. On inner surfaces of the driving plates 606, are provided a layer of arc friction plates 606a bonded to the driving plates 606 via pressing. A space is provided between the friction plates 606a and the opposite end face of the driving cylinder 607. Both the driving disc 602 and the driving cylinder 607 between the permanent magnet 603c and the opposite end faces of the electromagnetic iron core 603 are provided with several sets of magnetic insulation grooves 622 and 607a. When the coil 604 is energized, a magnetic attraction force applied by the electromagnetic iron core 603 to the driving plates 606 is larger than that applied by the permanent magnet 603c to the driving plates 606.

As shown in FIG. 25, the specific working process of the electromagnetic driving device according to the present invention in an air pump is as below.

After being started, an engine drives the driving disc 602 (a belt wheel) to rotate. When the pressure within the air pump is equal to or more than a fourth set value 6-8 kg (when a braking system can work normally), the air pump is not required to work. A pressure switch 625 controls the coil 604 to be energized, the driving plates 606 are sucked onto an inner end face of the driving disc 602, and the friction material 606a on the driving plates 606 is not in contact with the driving cylinder 607, so the driving cylinder 607 may not transfer the power of the driving disc 602 to the air pump spindle 609, and the air pump does not work.

When the pressure within the air pump is less than the fourth set value 6-8 kg (when the braking system cannot work normally), the pressure switch 525 controls the coil 604 to be off, the electromagnetic iron force 603 does not apply the magnetic attraction force to the driving plates 606, and the three driving plates 606 are firmly sucked outside the opposite end face of the driving cylinder 607 under action of a magnetic field of the permanent magnet 603c, so that the driving disc 602 drives the driving cylinder 607 to rotate via the three driving plates 606 and the driving cylinder 607 further drives the air pump spindle 609 to rotate, so that the air pump enters a working state.

When the electromagnetic clutch malfunctions in the running process to result in a sudden power cut of the coil 604, the driving plates 606 are not attracted by the electromagnetic icon core 603, the driving plates 606 are firmly sucked onto the outer wall of the driving cylinder 607 under the action of the magnetic field of the permanent magnet 603c, and the friction plates 606a on the inner surfaces of the driving plates 606 tightly compress the driving cylinder 607, so that the driving disc 602 is allowed to transfer power to the driving cylinder 607 via the driving plates 606 to further drive the air pump spindle 609 to rotate, thereby enabling the air pump to enter a working state when a sudden power cut occurs, and ensuring that a vehicle is able to be braked normally when the sudden power cut occurs.

Of course, a specific position of the permanent magnet 603c is not limited to being mounted on the air pump spindle 609 via the bearing 602a as shown in FIG. 25. The permanent magnet 603c may also be inlaid outside the end face of the driving cylinder 607, or the end face of the driving cylinder 607 opposite to the driving plates 606 is directly made of a permanent magnet material.

According to the present invention, a method for manufacturing the above electromagnetic driving device (applied in an air pump) is provided. This manufacturing method is basically similar to that in Embodiment 5. The differences therebetween lie in that: the driving plates 606 are hinged to the inside end face of the circumference of the driving disc 602 (on the outside end face in Embodiment 5), the first electrical control device in step (d) is the permanent magnet 603c and the electromagnet assembly consisting of the electromagnetic iron core 603 and the coil 604, the permanent magnet 603c is sheathed on an outer ring of the air pump spindle 609 and fixed on the air pump shell 609a via a bolt, the permanent magnet 603c is mounted in the inner cavity of the driving cylinder 607, the electromagnet assembly is mounted outside the opposite end face of the driving disc 602, the electromagnetic iron core 603 is fixed on the air pump shell 509a via the bolt; and the magnetic attraction force applied by the electromagnetic iron core 603 to the driving plates 606 is larger than that applied by the permanent magnet 603c to the driving plates 606, when the coil 604 is energized.

A method for controlling the above electromagnetic driving device (applied in an air pump) according to the present invention is the same as the controlling method in Embodiment 5.

In Embodiments 1-6, the number of the driving plates is not limited to three, as long as there is more than one driving plate. Different numbers of driving plates may be set according to a type of a driving device, thus ensuring the optimal driving effect. The driving plates may be connected with friction plates for increasing friction for better driving. The friction plates may also be omitted, and wear-resistant treatment is performed on the driving plates and the driving cylinder. The driving plates are made of steel, iron or other electric-conductive and magnetic-conductive materials. The friction plates are made of all-metal, asbestos or other wear-resistant material.

The connection way of the friction plates and the driving plates may be pressed bonding in Embodiments 1-6, and may also be bolted connection, riveting or other connection ways.

The forgoing embodiments merely show preferred embodiments of the present invention, but are not intended to limit the scope of the present invention. Various variations and improvements made to the technical solutions of the present invention by a person of ordinary skill in the art without departing from the spirit of the present invention design shall fall into the protection scope defined by the claims of the present invention.

INDUSTRIAL APPLICABILITY

The electromagnetic driving device according to the present invention is applicable for industrial production. The electromagnetic driving device may be applied to manufacturing of various electromagnetic fan clutches, thereby effectively avoiding the failure of an electromagnetic clutch caused by a sudden malfunction of a power supply system of a vehicle, and ensuring that the device can still play a role of cooling an engine when the electromagnetic clutch fails; and it may also be applied to air pumps the work of which is controlled by electromagnetic clutches, thereby ensuring that an air pump can enter a working state when the electromagnetic clutch fails, and then ensuring that a vehicle can enter a braking state in the case of a sudden power cut.

The method for manufacturing an electromagnetic driving device according to the present invention is applied to manufacturing of the electromagnetic driving device according to the present invention. The manufacturing method is simple, low in cost and applicable to manufacturing.

The method for controlling an electromagnetic driving device according to the present invention is applicable to controlling the working state of the electromagnetic driving device according to the present invention according to temperature change of an engine or pressure value change of an air pump. The controlling method is simple, practicable, and easy to operate.

What is claimed is:

1. An electromagnetic driving device, comprising a driving disc (102; 202; 302; 502), and further comprising a first driving device, a second driving device and a first electrical control device (103; 104; 203; 204; 303; 304a; 503; 504),
wherein when the first electrical control device (103; 104; 203; 204; 303; 304a; 503; 504) is energized, the first electrical control device (103; 104; 203; 204; 303; 304a; 503; 504) drives the first driving device such that the second driving device is disengaged from the driving disc (102; 202; 302; 502); and
when the first electrical control device (103; 104; 203; 204; 303; 304a; 503; 504) is de-energized, the first driving device is motivated by a centrifugal force such that the second driving device is engaged with the driving disc (102; 202; 302; 502);
wherein the second driving device comprises a driving cylinder (107; 207; 307; 507); the first driving device comprises at least one driving plate (106; 206; 306; 506);
wherein the electromagnetic driving device further comprises:
a driven device (109; 209; 309; 509), wherein the second driving device is fixedly connected to the driven device (109; 209; 309; 509); and
a driving shaft (201) and a magnet fixing disc (210), wherein the driven device (209) is a fan fixing disc, the driving disc (202) is fixedly mounted on the driving shaft (201), the fan fixing disc is mounted on the driving shaft (201) via a first bearing (208), and the magnet fixing disc (210) is fixedly mounted on the driving shaft (201) and used for driving the fan fixing disc to rotate at a differential rate due to magnetic effect.

2. The electromagnetic driving device, as recited in claim 1, wherein the driving plate (106; 306; 506) comprises three arc plates, three sets of protrusions (117; 317; 517) are provided inside a circumference of the driving disc (102; 302; 502), the three arc plates are hinged to the corresponding protrusions (117; 317; 517) of the driving disc (102; 302; 502) via pin shafts (124; 324; 524); and
the driving cylinder (107; 307; 507) has an end face opposite to the driving disc (102; 302; 502) inside the circumference of the driving disc (102; 302; 502), and a space is provided between the driving plate (106; 306; 506) and the opposite end face of the driving cylinder (107; 307; 507).

3. The electromagnetic driving device, as recited in claim 1, wherein, at the opposite end faces of the driving cylinder (107; 207; 307; 507), the driving plate (106; 206; 306; 506) is fixedly connected with arc friction plates (106a; 206a; 306a; 506a).

4. An electromagnetic driving device, comprising a driving disc (102; 202; 302; 502), and further comprising a first driving device, a second driving device and a first electrical control device (103; 104; 203; 204; 303; 304a; 503; 504),
wherein when the first electrical control device (103; 104; 203; 204; 303; 304a; 503; 504) is energized, the first electrical control device (103; 104; 203; 204; 303; 304a; 503; 504) drives the first driving device such that the second driving device is disengaged from the driving disc (102; 202; 302; 502); and
when the first electrical control device (103; 104; 203; 204; 303; 304a; 503; 504) is de-energized, the first driving device is motivated by a centrifugal force such that the second driving device is engaged with the driving disc (102; 202; 302; 502);
wherein the second driving device comprises a driving cylinder (107; 207; 307; 507); the first driving device comprises at least one driving plate (106; 206; 306; 506);
wherein the electromagnetic driving device further comprises:
a driven device (109; 209; 309; 509), wherein the second driving device is fixedly connected to the driven device (109; 209; 309; 509); and
a driving shaft (301) and a magnet fixing disc (310), wherein the driven device (309) is a fan fixing disc, the driving disc (302) is fixedly mounted on the driving shaft (301), the fan fixing disc is mounted on the driving shaft (301) via a first bearing (308), the magnet fixing disc (310) is fixedly mounted on the driving shaft (301) via a third bearing (311) and used for driving the fan fixing disc to rotate at a differential rate due to magnetic effect, the driving disc (302) is engaged with the magnet fixing disc (310) when an electrical control device (304b) is energized, and the driving disc (302) is disengaged with the magnet fixing disc (310) when the electrical control device (304b) is de-energized.

5. The electromagnetic driving device, as recited in claim 4, wherein the driving plate (106; 306; 506) comprises three arc plates, three sets of protrusions (117; 317; 517) are provided inside a circumference of the driving disc (102; 302; 502), the three arc plates are hinged to the corresponding protrusions (117; 317; 517) of the driving disc (102; 302; 502) via pin shafts (124; 324; 524); and
the driving cylinder (107; 307; 507) has an end face opposite to the driving disc (102; 302; 502) inside the circumference of the driving disc (102; 302; 502), and a space is provided between the driving plate (106; 306; 506) and the opposite end face of the driving cylinder (107; 307; 507).

6. The electromagnetic driving device, as recited in claim 4, wherein, at the opposite end faces of the driving cylinder (107; 207; 307; 507), the driving plate (106; 206; 306; 506) is fixedly connected with arc friction plates (106a; 206a; 306a; 506a).

7. A method for manufacturing an electromagnetic driving device, comprising steps of:
(a) forming a driving disc (102; 202; 302; 502);
(b) forming a first driving device;
(c) forming a second driving device;
(d) forming a first electrical control device (103, 104; 203, 204; 303, 304a; 503, 504); and
(e) mounting the driving disc (102; 202; 302; 502), the first driving device, the second driving device and the first electrical control device (103, 104; 203, 204; 303, 304a; 503, 504), such that:
when the first electrical control device (103; 104; 203; 204; 303; 304a; 503; 504) is energized, the first electrical control device (103; 104; 203; 204; 303; 304a; 503; 504) drives the first driving device such that the second driving device is disengaged from the driving disc (102; 202; 302; 502); and
when the first electrical control device (103; 104; 203; 204; 303; 304a; 503; 504) is de-energized, the first driving device is motivated by a centrifugal force such that the second driving device is engaged with the driving disc (102; 202; 302; 502);

wherein the second driving device comprises a driving cylinder (107; 207; 307; 507); the first driving device comprises at least one driving plate (106; 206; 306; 506);

wherein the first driving device in step (b) comprises three arc driving plates (106; 206; 306; 506), three sets of protrusions (117; 217; 317; 517) are provided outside a circumference of the driving disc (102; 202; 302; 502) in step (a), the three driving plates (106; 206; 306; 506) are hinged to the corresponding protrusions (117; 217; 317; 517) of the driving disc (102; 202; 302; 502);

the second driving device in step (c) is a driving cylinder (107; 207; 307; 507), the driving cylinder (107; 207; 307; 507) has an opposite end face outside the circumference of the driving disc (102; 202; 302; 502) after being mounted, and a space is provided between the driving plates (106; 206; 306; 506) and the opposite end face of the driving cylinder (107; 207; 307; 507);

the first electrical control device (103; 104; 203; 204; 303; 304a; 503; 504) in step (d) is an electromagnet assembly consisting of an electromagnetic iron core and a coil, and the electromagnet assembly is mounted in an inner cavity where the circumference of the driving disc (102; 202; 302; 502) is located; and the electromagnetic driving device further comprises a driven device (109; 209; 309; 509), and the driving cylinder (107; 207; 307; 507) is fixed on the driven device (109; 209; 309; 509) after the driven device (109; 209; 309; 509) is mounted.

\* \* \* \* \*